(12) United States Patent
Lim et al.

(10) Patent No.: US 12,149,349 B2
(45) Date of Patent: *Nov. 19, 2024

(54) METHOD FOR CONSTRUCTING PREAMBLE IN WIRELESS COMMUNICATION SYSTEM

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Eunsung Park, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 237 days.

This patent is subject to a terminal disclaimer.

(21) Appl. No.: 17/775,248

(22) PCT Filed: Nov. 9, 2020

(86) PCT No.: PCT/KR2020/015623
§ 371 (c)(1),
(2) Date: May 6, 2022

(87) PCT Pub. No.: WO2021/091341
PCT Pub. Date: May 14, 2021

(65) Prior Publication Data
US 2022/0393792 A1    Dec. 8, 2022

Related U.S. Application Data

(60) Provisional application No. 62/933,381, filed on Nov. 9, 2019.

(30)    Foreign Application Priority Data

Nov. 29, 2019   (KR) ......................... 10-2019-0156968
Dec. 9, 2019    (KR) ......................... 10-2019-0163057
(Continued)

(51) Int. Cl.
*H04L 1/00*      (2006.01)
*H04B 7/0452*    (2017.01)
*H04W 84/12*     (2009.01)

(52) U.S. Cl.
CPC ......... *H04L 1/0063* (2013.01); *H04B 7/0452* (2013.01); *H04L 1/0008* (2013.01); *H04W 84/12* (2013.01)

(58) Field of Classification Search
None
See application file for complete search history.

(56)    References Cited

U.S. PATENT DOCUMENTS 11,848,777 B2     12/2023  Lim et al.
2019/0097850 A1*   3/2019  Kenney ............... H04L 27/0012
(Continued)

FOREIGN PATENT DOCUMENTS

CN    106576020    4/2017
CN    107534897    1/2018
(Continued)

OTHER PUBLICATIONS

U.S. Appl. No. 18/303,733, Office Action dated Jul. 18, 2023, 12 pages.
(Continued)

*Primary Examiner* — Brian S Roberts
(74) *Attorney, Agent, or Firm* — LEE, HONG, DEGERMAN, KANG & WAIMEY

(57)    ABSTRACT

One embodiment according to the present specification relates to a method for constructing a preamble in a wireless
(Continued)

| 8μs | 8μs | 4μs | 4μs | | | | | |
|---|---|---|---|---|---|---|---|---|
| L-LTF | L-STF | L-SIG | RL-SIG | U-SIG | EHT-SIG | EHT-STF | EHT-LTF | Data |

LAN (WLAN) system. According to various embodiments, a PPDU may comprise a first signal field and a second signal field. The first signal field may include first information about PHY version. The first information may be determined on the basis of whether the PPDU is an EHT PPDU. The second signal field may include second information about the transmission of the PPDU, which is set on the basis of the first information.

14 Claims, 32 Drawing Sheets

(30) Foreign Application Priority Data

| Dec. 11, 2019 | (KR) | 10-2019-0165063 |
| Dec. 12, 2019 | (KR) | 10-2019-0166041 |
| Dec. 16, 2019 | (KR) | 10-2019-0168226 |
| Feb. 25, 2020 | (KR) | 10-2020-0023187 |

(56) References Cited

U.S. PATENT DOCUMENTS

| 2019/0116513 | A1  | 4/2019 | Verma et al. | |
| 2021/0044398 | A1  | 2/2021 | Noh et al. | |
| 2021/0273838 | A1* | 9/2021 | Park | H04L 27/2602 |
| 2021/0377971 | A1* | 12/2021 | Park | H04W 74/006 |
| 2022/0279562 | A1* | 9/2022 | Park | H04W 84/12 |
| 2022/0311543 | A1* | 9/2022 | Park | H04L 1/0041 |

FOREIGN PATENT DOCUMENTS

| KR | 101558112 | 10/2015 |
| KR | 1020170042370 | 4/2017 |
| KR | 1020170066578 | 6/2017 |
| WO | 2016021819 | 2/2016 |

OTHER PUBLICATIONS

The State Intellectual Property Office of the People's Republic of China Application Serial No. 202080091479.8, Office Action dated Mar. 24, 2023, 7 pages.
PCT International Application No. PCT/KR2020/015623, International Search Report dated Jan. 29, 2021, 2 pages.
Korean Intellectual Property Office Application No. 10-2022-7017304, Office Action dated May 20, 2024, 5 pages.
Chen et al., "11be Preamble Structure," IEEE 802. 11-19/1516r0, Sep. 2019, 15 pages.
LAN/MAN Standards Committee of the IEEE Computer Society, "Wireless LAN Medium Access Control (MAC) and Physical Layer (PHY) Specification," IEEE P802.11ax/D4.0, Feb. 2019, 746 pages.
Vermani et al., "Forward Compatibility for WiFi Preamble Design," IEEE 802.11-19/1519r0, Sep. 2019, 14 pages.
United States Patent and Trademark Office U.S. Appl. No. 18/386,510, Office Action dated May 17, 2024, 10 pages.

* cited by examiner (a)

| L-STF | L-LTF | L-SIG | RL-SIG | ETH-SIG1 (2210) | ETH-SIG2 (2220) | ETH-STF | ETH-LTF | EHT-DATA |

| L-STF | L-LTF | L-SIG | RL-SIG | ETH-SIG1 (2310) | ETH-SIG3 (2330) | ETH-STF | ETH-LTF | DATA |

| L-STF | L-LTF | L-SIG | RL-SIG | ETH-SIG1 (2410) | ETH-SIG2 (2420) | ETH-SIG3 (2430) | ETH-STF | ETH-LTF | ETH-DATA |

| L-STF | L-LTF | L-SIG | RL-SIG | ETH-SIG1 (2610) | ETH-SIG2 (2620) | ETH-STF | ETH-LTF | ETH-DATA |

| L-STF | L-LTF | L-SIG | RL-SIG | ETH-SIG1 (2710) | ETH-STF | ETH-LTF | ETH-DATA |

2700

METHOD FOR CONSTRUCTING PREAMBLE IN WIRELESS COMMUNICATION SYSTEM

CROSS-REFERENCE TO RELATED APPLICATIONS

This application is the National Stage filing under 35 U.S.C. 371 of International Application No. PCT/KR2020/015623, filed on Nov. 9, 2020, which claims the benefit of U.S. Provisional Application No. 62/933,381, filed on Nov. 9, 2019, and also claims the benefit of earlier filing date and right of priority to Korean Application Nos. 10-2019-0156968, filed on Nov. 29, 2019, 10-2019-0163057, filed on Dec. 9, 2019, 10-2019-0165063, filed on Dec. 11, 2019, 10-2019-0166041, filed on Dec. 12, 2019, 10-2019-0168226, filed on Dec. 16, 2019, and 10-2020-0023187, filed on Feb. 25, 2020, the contents of which are all incorporated by reference herein in their entirety.

BACKGROUND

Field of the Disclosure

This specification relates to a technique for configuring a preamble in a wireless LAN system, and more particularly, to a method for configuring a preamble in a wireless LAN system and an apparatus supporting the same.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Objects

In the EHT standard, in order to support high throughput and high data rate, a wide bandwidth (e.g., 160/320 MHz), 16 streams, and/or multi-link (or multi-band) operation may be used. Accordingly, a new frame format may be used to support the transmission method (or operation). When the EHT signal of the new frame format is transmitted through the 2.4 GHz/5 GHz/6 GHz band, not only the EHT standard receiver but also convention Wi-Fi receivers (e.g., 802.11n, 802.11ac, 802.11ax standard STA) may receive the EHT signal transmitted through the band. In this case, a field for supporting backward compatibility with conventional Wi-Fi and early indication of an EHT signal may be required.

Technical Solutions

According to various embodiments, a receiving station (STA) may receive a Physical Layer Protocol Data Unit (PPDU).

According to various embodiments, the PPDU includes a first signal field and a second signal field, the first signal field is transmitted through two symbols, the first signal field includes first information related to a Physical layer (PHY) version of the PPDU, the first information is determined based on whether the PPDU is an extremely high throughput (EHT) PPDU, and the second signal field includes second information which is related to transmission of the PPDU configured based on the first information.

According to various embodiments, the receiving STA may decode the PPDU based on the first signal field and the second signal field.

Technical Effects of the Disclosure

According to various embodiments, the PPDU may include a first signal field and a second signal field.

According to various embodiments, the receiving STA may identify a version of the received PPDU based on the first signal field. The receiving STA may confirm/check that the received PPDU is an EHT PPDU based on the first signal field.

According to various embodiments, the second signal field may include information related to PPDU transmission. Accordingly, there is an effect that the receiving STA can quickly check information related to PPDU transmission based on the second signal field.

According to various embodiments, the PPDU may be configured and transmitted for a single user and multiple users. Accordingly, there is an effect that PPDUs having the same configuration can be transmitted for a single user and multiple users.

BRIEF DESCRIPTION OF THE DRAWINGS

FIG. 22 shows an example of the configuration of an SU PPDU.

FIG. 23 shows another example of the configuration of an SU PPDU.

FIG. 24 shows an example of the configuration of an MU PPDU.

FIG. 26 shows an example of the configuration of a TB PPDU.

FIG. 27 shows another example of the configuration of a TB PPDU.

DETAILED DESCRIPTION

Figure 1:
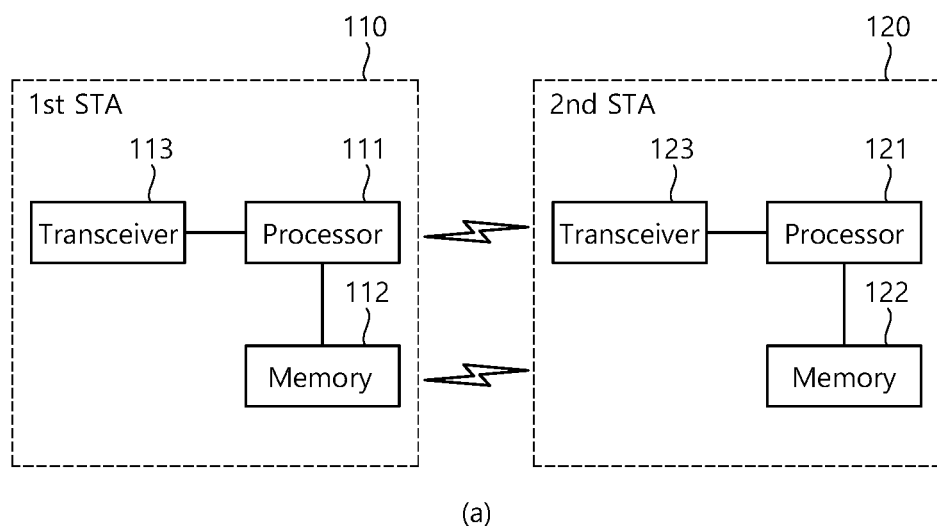
FIG. 1 shows an example of a transmitting apparatus and/or receiving apparatus of the present specification.
Figure 1:
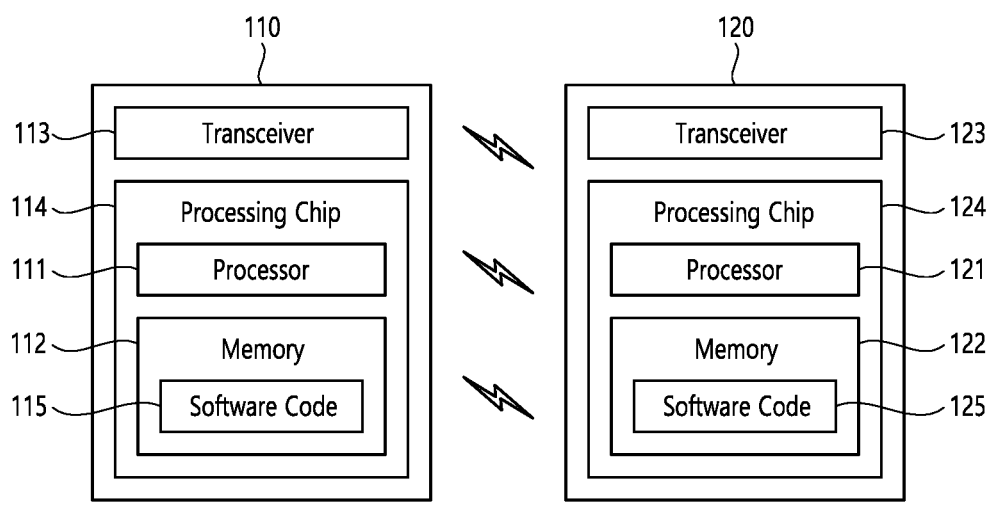

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
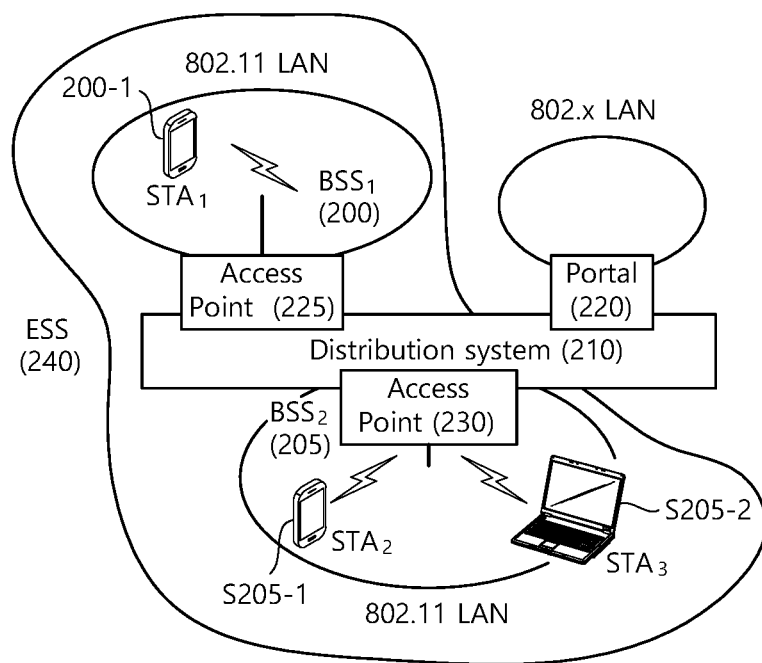
FIG. 2 is a conceptual view illustrating the structure of a wireless local area network (WLAN).
Figure 2:
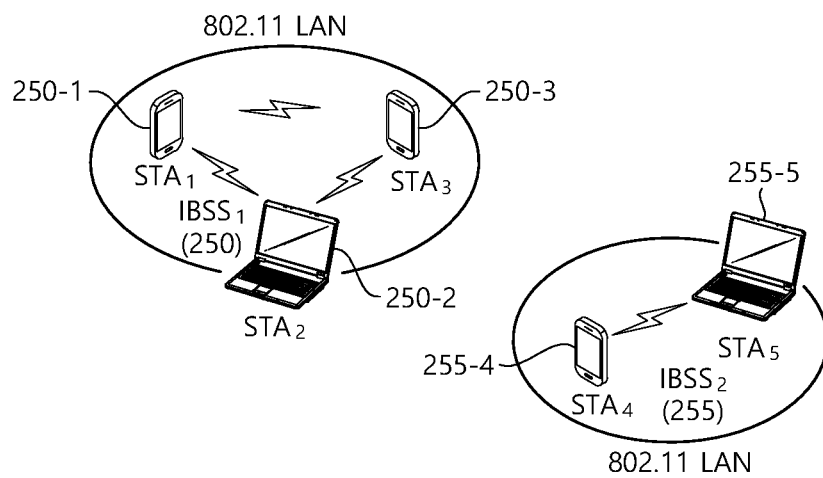

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
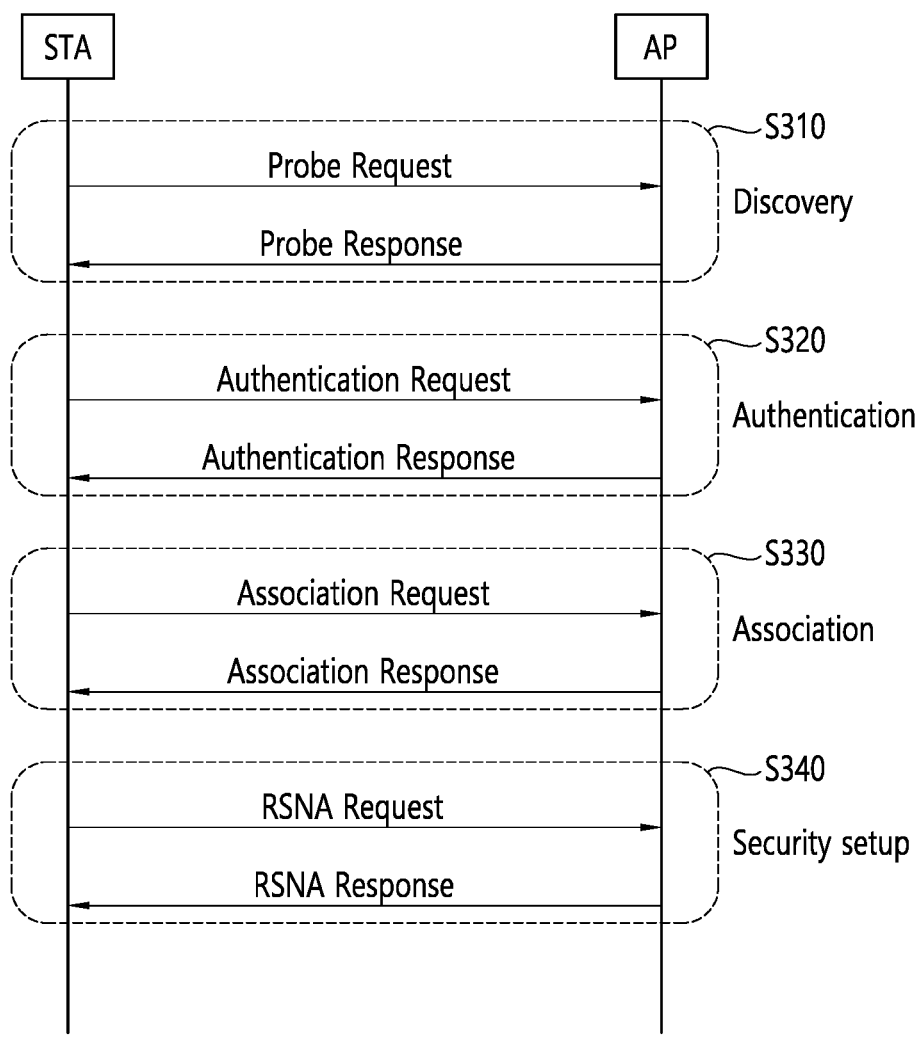
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
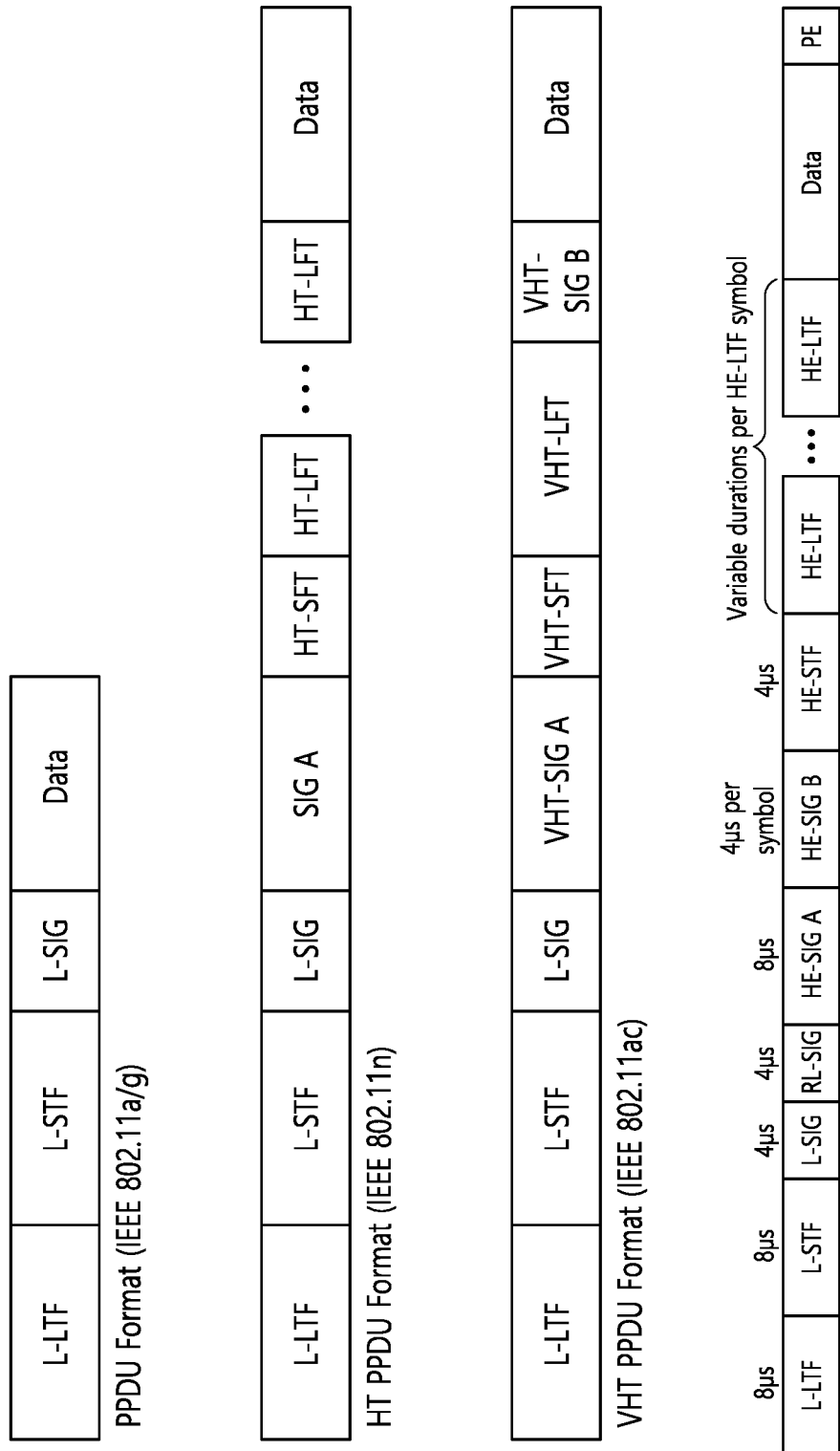
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
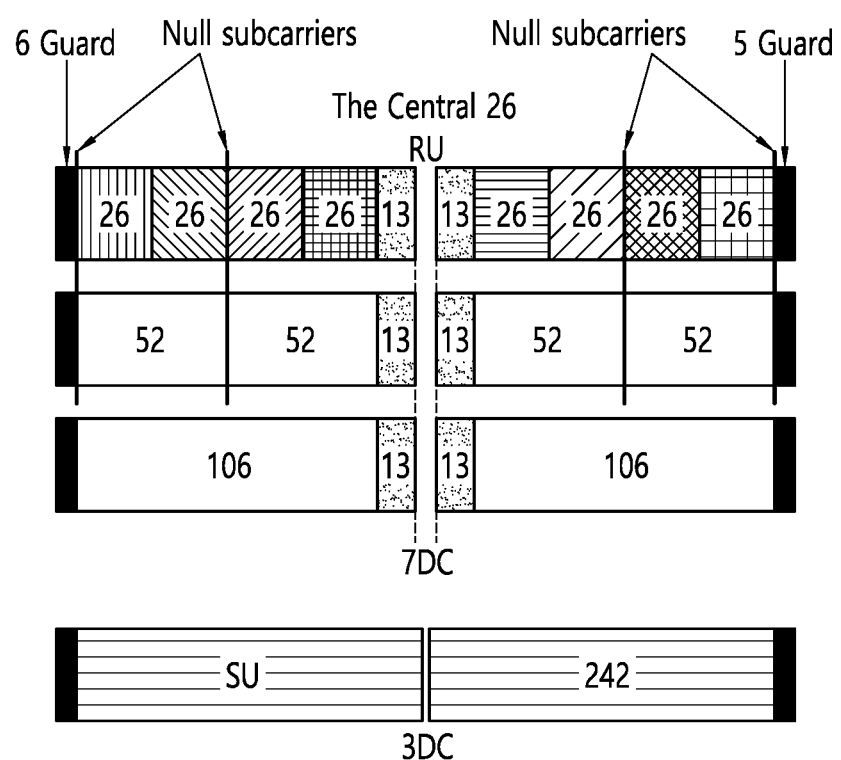
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
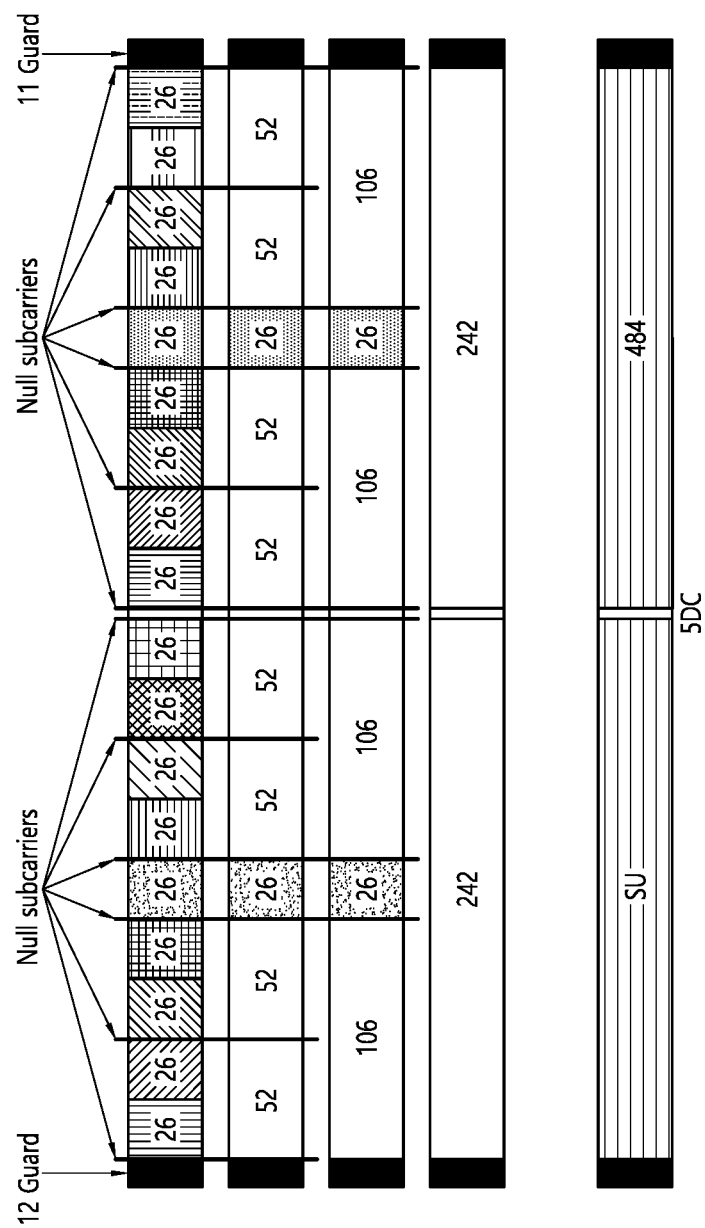
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
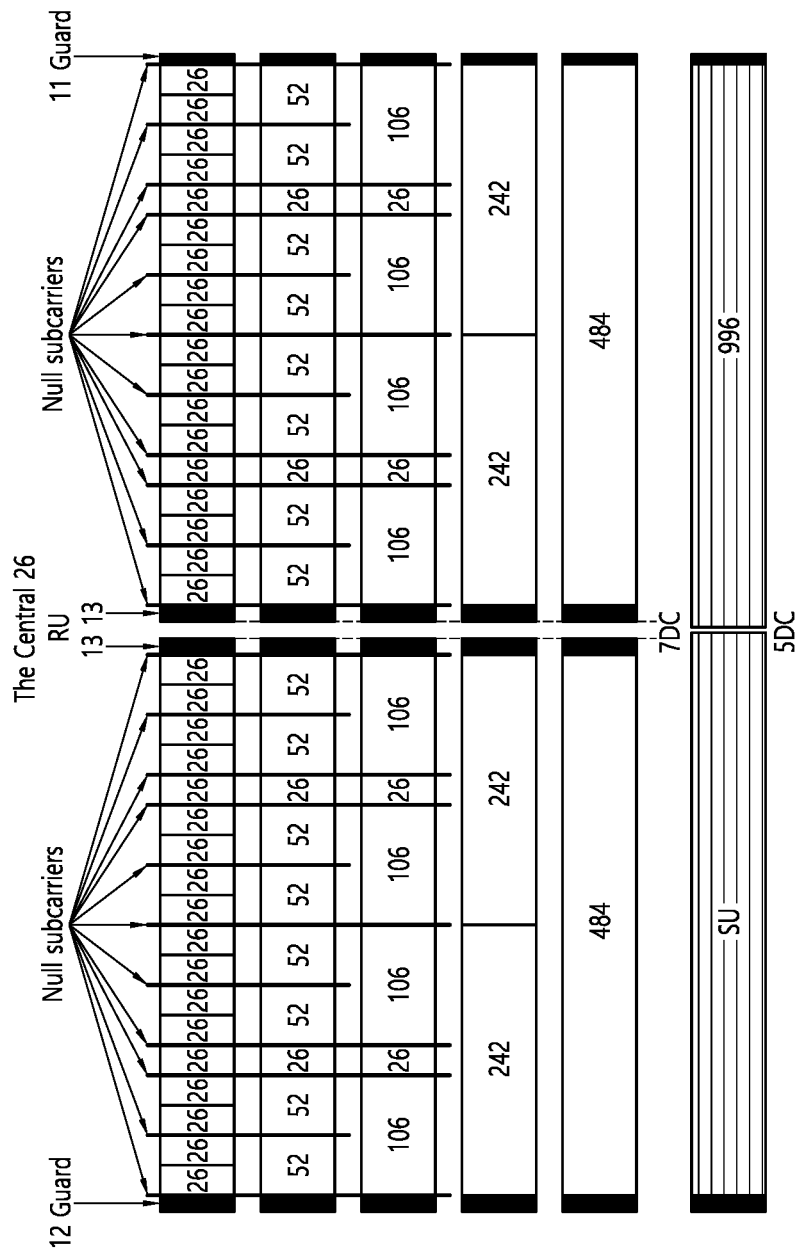
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
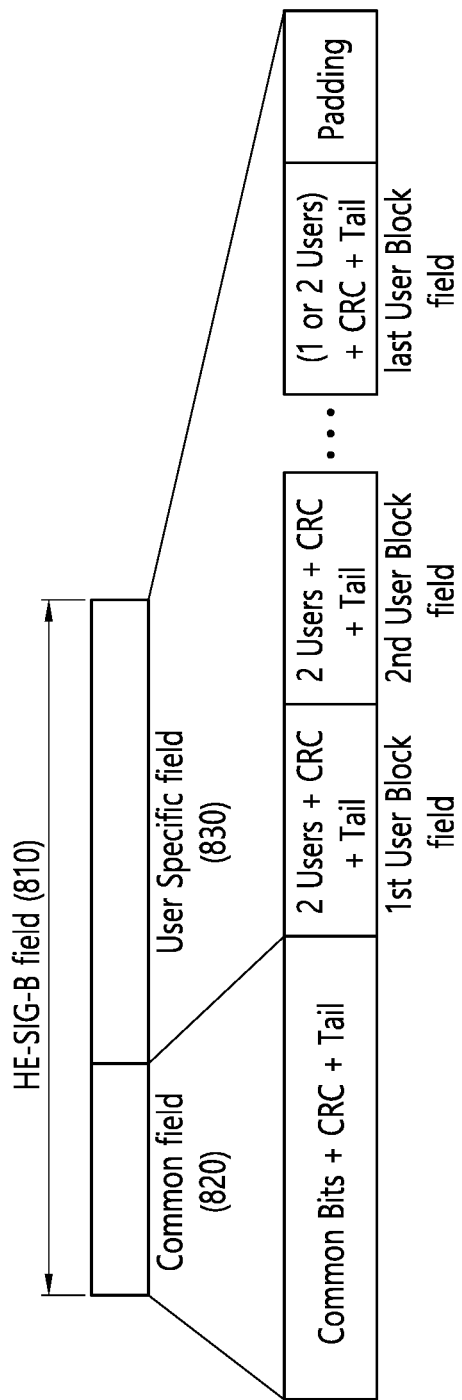
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
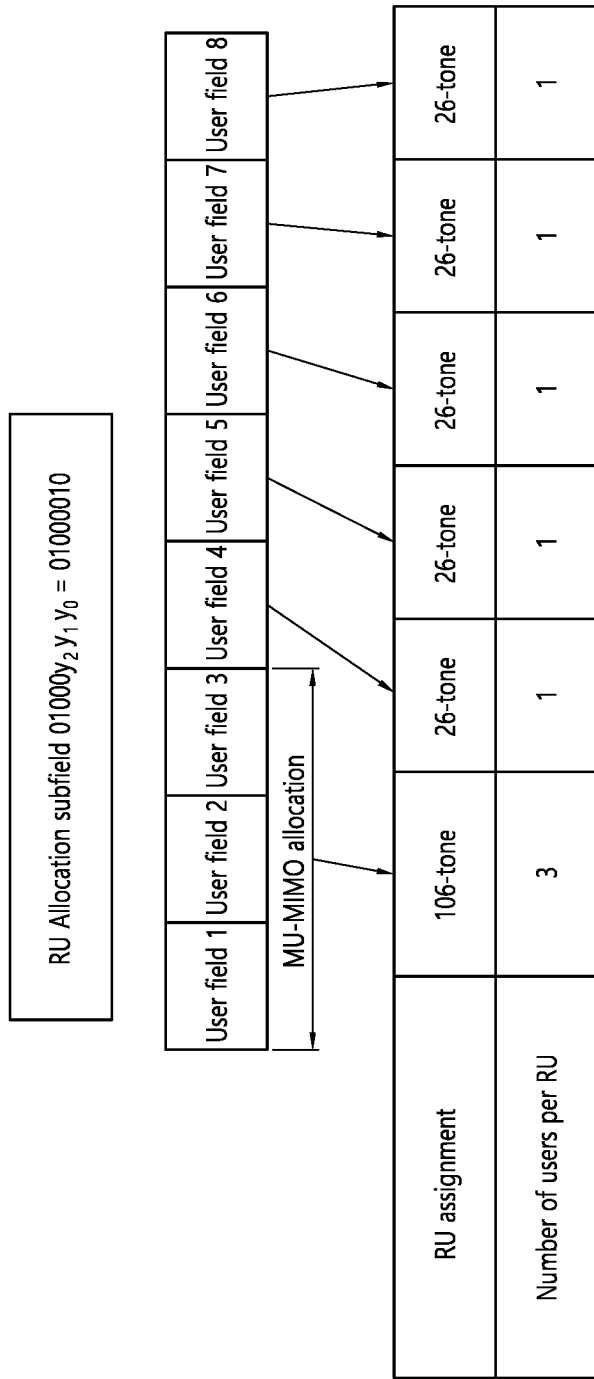
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|  | 0100-0110 | 2-4 | 1 | | | | | | | 4-6 | |
|  | 0111-1000 | 3-4 | 3 | | | | | | | 6-7 | |
|  | 1001 | 4 | 4 | | | | | | | 8 | |
| 3 | 0000-0011 | 1-4 | 1 | 1 | | | | | | 3-6 | 13 |
|  | 0100-0110 | 2-4 | 2 | 1 | | | | | | 5-7 | |
|  | 0111-1000 | 3-4 | 3 | 1 | | | | | | 7-8 | |
|  | 1001-1011 | 2-4 | 2 | 2 | | | | | | 6-8 | |
|  | 1100 | 3 | 3 | 2 | | | | | | 8 | |
| 4 | 0000-0011 | 1-4 | 1 | 1 | 1 | | | | | 4-7 | 11 |
|  | 0100-0110 | 2-4 | 2 | 1 | 1 | | | | | 6-8 | |
|  | 0111 | 3 | 3 | 1 | 1 | | | | | 8 | |
|  | 1000-1001 | 2-3 | 2 | 2 | 1 | | | | | 7-8 | |
|  | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|  | 0100-0101 | 2-3 | 2 | 1 | 1 | 1 | | | | 7-8 | |
|  | 0110 | 2 | 2 | 2 | 1 | 1 | | | | 8 | |
| 6 | 0000-0010 | 1-3 | 1 | 1 | 1 | 1 | 1 | | | 6-8 | 4 |
|  | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
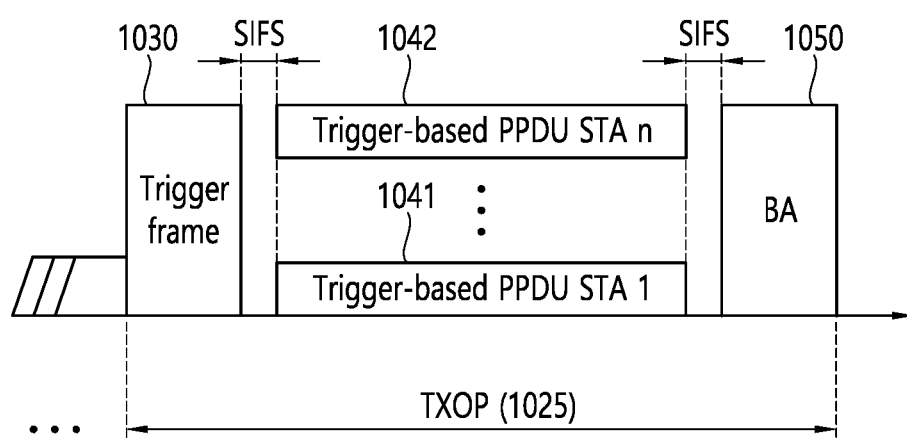
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
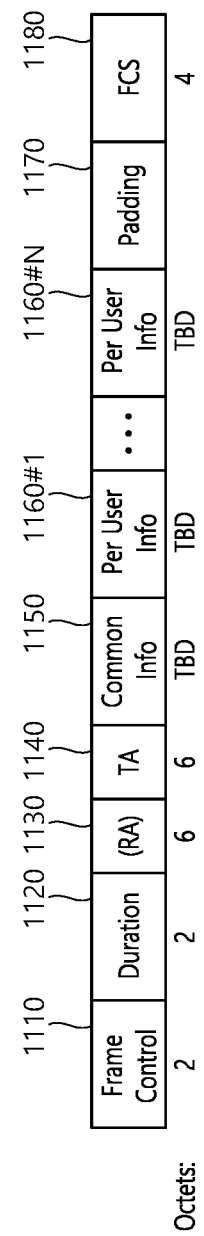
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
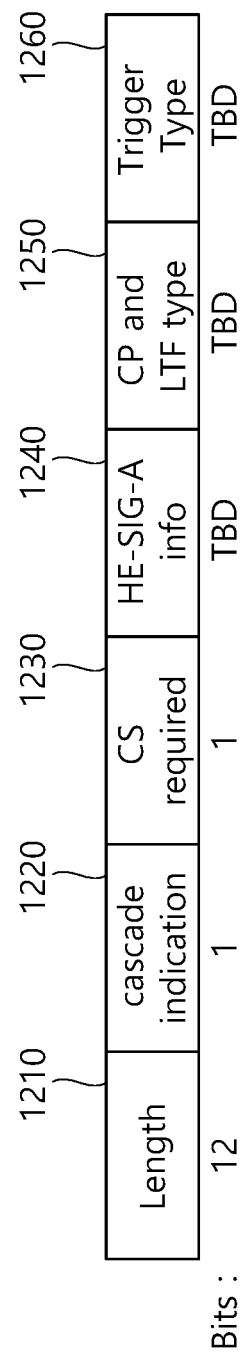
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
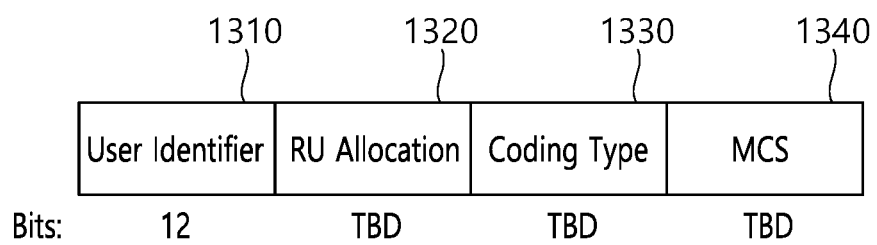
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
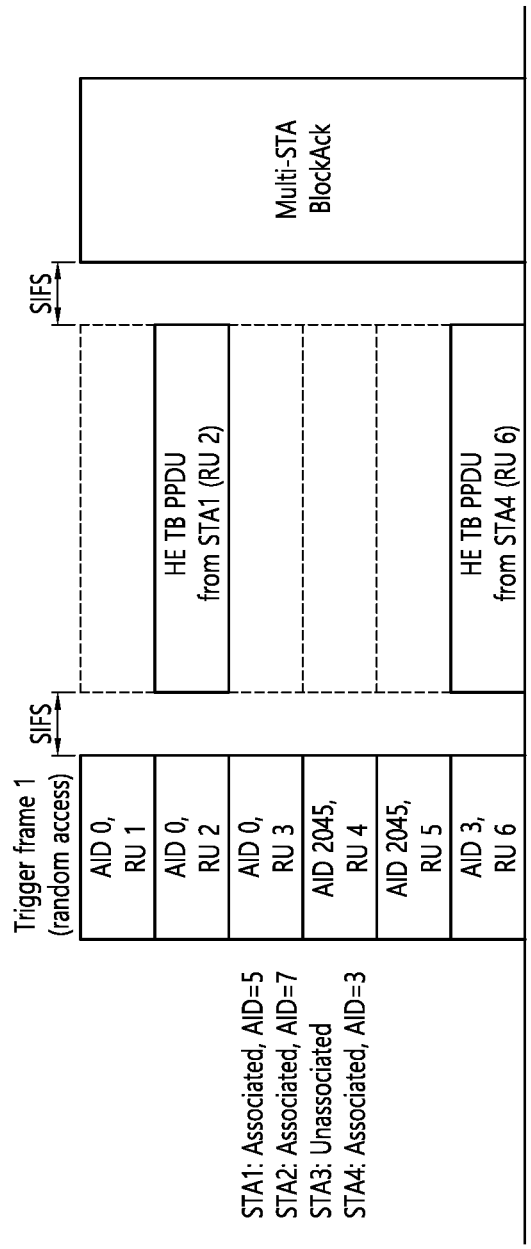
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
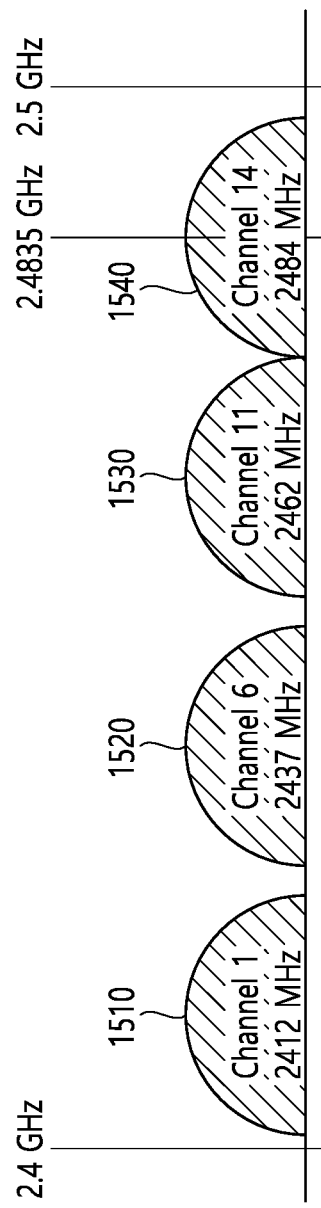
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
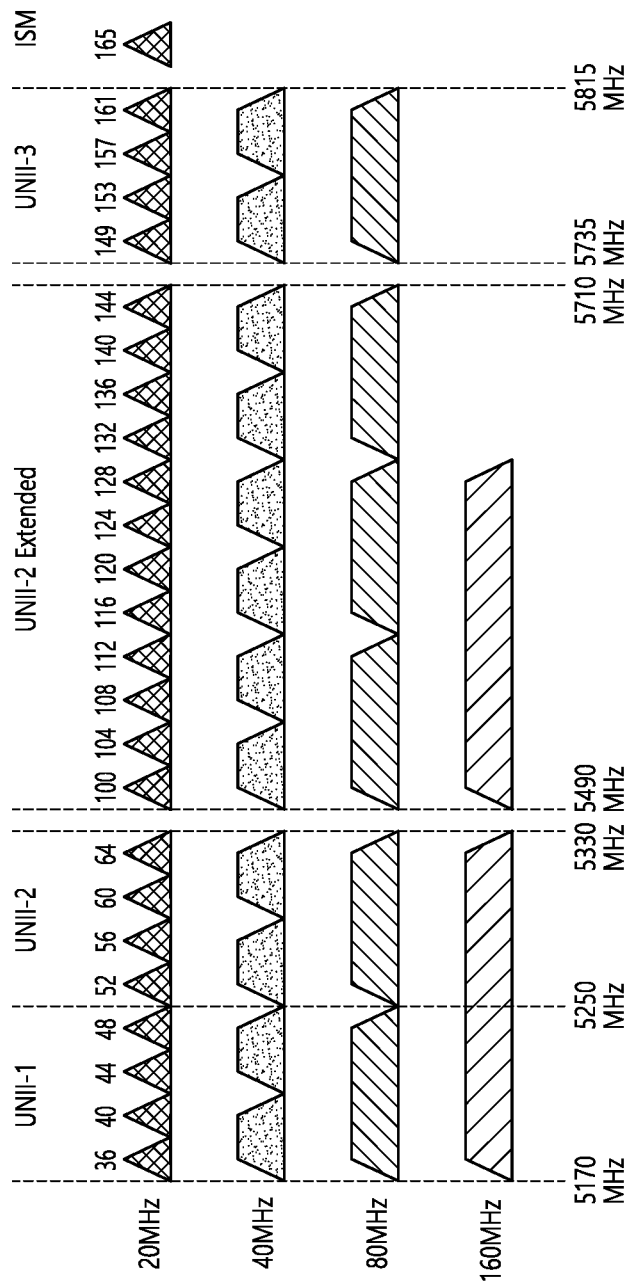
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
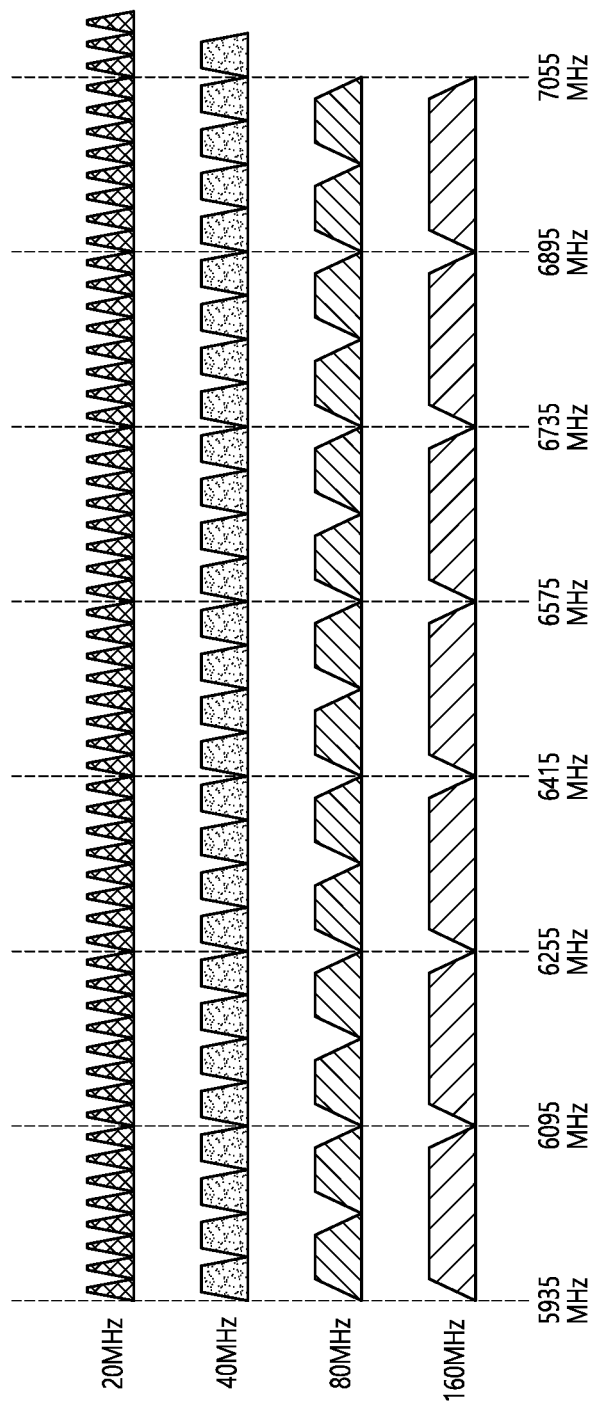
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may represent some or all of the PPDU types used in the EHT system. For example, the example of FIG. 18 may be used for both a single-user (SU) mode and a multi-user (MU) mode, or may be used only for the SU mode, or may be used only for the MU mode. For example, a trigger-based (TB) PPDU on the EHT system may be separately defined or configured based on the example of FIG. 18. The trigger frame described through at least one of FIGS. 10 to 14 and the UL-MU operation initiated by the trigger frame (for example, the transmission operation of the TB PPDU) may be directly applied to the EHT system.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include the technical features of the HE-SIG-B shown in the examples of FIGS. 8 to 9. The EHT-SIG may be referred to by various names such as a second SIG field, a second SIG, a second type SIG, a control signal, a control signal field, and a second (type) control signal.

The EHT-SIG may include N-bit information (for example, 1-bit information) regarding whether the EHT-PPDU supports the SU mode or the MU mode.

The EHT-SIG may be configured based on various MCS scheme. As described above, information related to the MCS scheme applied to the EHT-SIG may be included in the U-SIG. The EHT-SIG may be configured based on the DCM scheme. For example, among the N data tones (for example, 52 data tones) allocated for the EHT-SIG, a first modulation scheme may be applied to a contiguous half tone, and a second modulation scheme may be applied to the remaining contiguous half tones. That is, the transmitting STA may modulate specific control information to the first symbol based on the first modulation scheme and allocate it to contiguous half tones, and may modulate the same control information to the second symbol based on the second modulation scheme and allocate it to the remaining contiguous half tones. As described above, information (for example, 1-bit field) related to whether the DCM scheme is applied to the EHT-SIG may be included in the U-SIG. The EHT-STF of FIG. 18 may be used to improve automatic gain control estimation in a multiple input multiple output (MIMO) environment or an OFDMA environment. The EHT-LTF of FIG. 18 may be used to estimate a channel in a MIMO environment or an OFDMA environment. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2× STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496{:}16{:}496)=\{-M,-1,M,0,-M,1,-M\}*(1+j)/sqrt(2) \quad \text{<Equation 6>}$$

Equation 7 to Equation 11 below relate to an example of a second type (i.e., 2×STF) sequence.

$$EHT\text{-}STF(-120{:}8{:}120)=\{M,0,-M\}*(1+j)/sqrt(2) \quad \text{<Equation 7>}$$

The EHT-STF for the 40 MHz PPDU may be configured based on the following equation.

$$EHT\text{-}STF(-248{:}8{:}248)=\{M,-1,-M,0,M,-1,M\}*(1+j)/sqrt(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504{:}8{:}504)=\{M,-1,M,-1,-M,-1,M,0,-M,1,M,1,-M,1,-M\}*(1+j)/sqrt(2) \quad \text{<Equation 9>}$$

The EHT-STF for the 160 MHz PPDU may be configured based on the following equation.

$$EHT\text{-}STF(-1016{:}16{:}1016)=\{M,-1,M,-1,-M,-1,M,0,-M,1,M,1,-M,1,-M,0,-M,1,-M,1,M,1,-M,0,-M,1,M,1,-M,1,-M\}*(1+j)/sqrt(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M,1,-M,1,M,1,-M,0,-M,1,M,1,-M,1,-M\}*(1+j)/sqrt(2)$$

$$EHT\text{-}STF(-504)=0,$$

$$EHT\text{-}STF(504)=0 \quad \text{<Equation 11>}$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1.6/3.2p) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
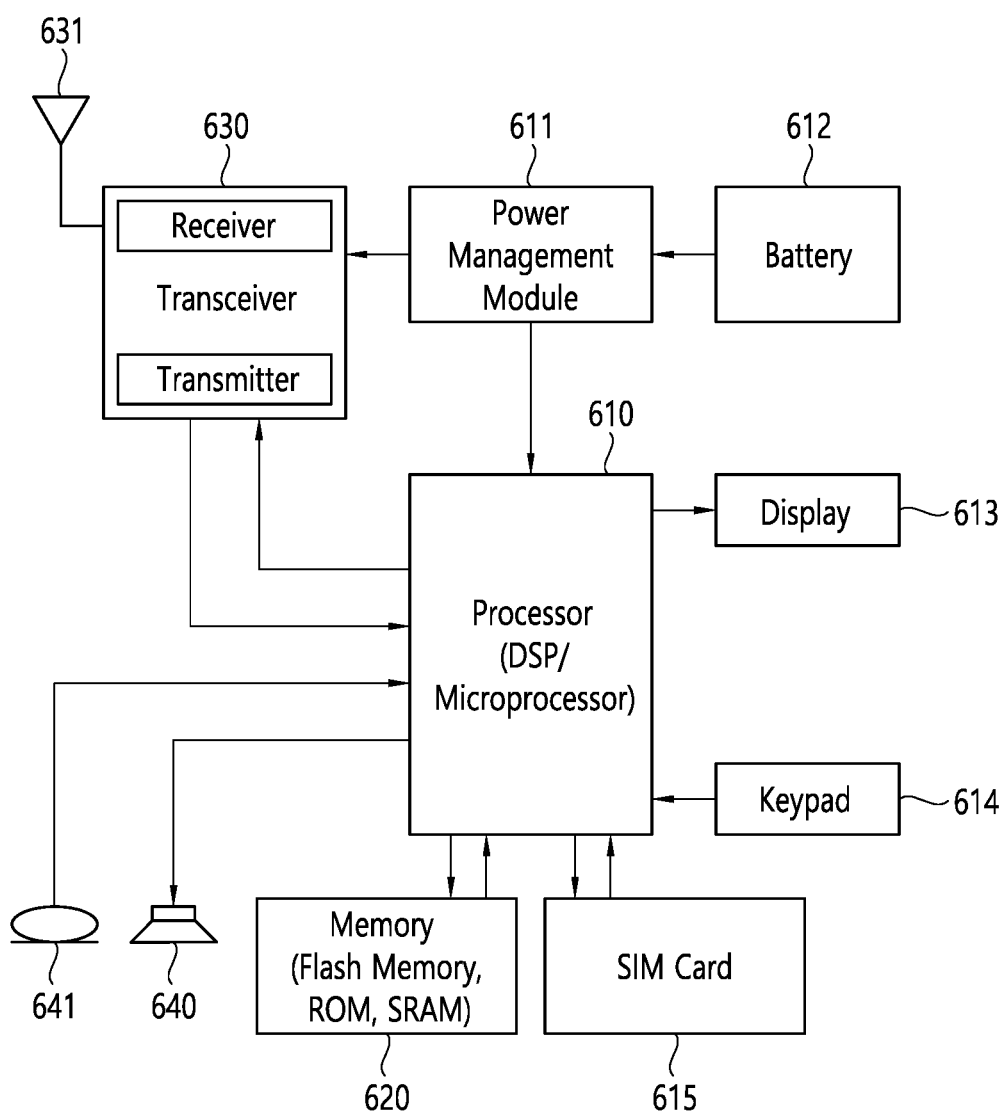
FIG. 19 illustrates an example of a modified transmitting device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

In the following specification, an EHT standard or a PPDU in compliance with the EHT standard may be described.

In order to provide a higher data rate than the 802.11ax standard, the EHT standard may be proposed. The EHT standard may support a wide bandwidth (e.g., a bandwidth of 320 MHz or more), 16 streams, and/or multi-link (or multi-band) operation. Accordingly, to support a transmission method based on the EHT standard, a new frame format may be used. When transmitting a signal through the 2.4/5/6 GHz band using the new frame format, conventional Wi-Fi receivers/STAs (e.g., receivers of 802.11n/ac/ax standards) as well as receivers supported by the EHT standard may also receive the EHT signal transmitted through the 2.4/5/6 GHz band.

Hereinafter, while supporting backward compatibility with the conventional Wi-Fi (e.g., 802.11n/ac/ax standard), technical features for an EHT PPDU (e.g., a common control field) indicating a PPDU (or packet) of the 802.11be standard may be proposed.

The preamble of the PPDU based on the EHT standard may be set in various ways. Hereinafter, an embodiment in which a preamble of a PPDU based on the EHT standard is configured may be described. Hereinafter, a PPDU based on the EHT standard may be described as an EHT PPDU. However, the EHT PPDU is not limited to the EHT standard. The EHT PPDU may be configured based new standard that is an improvement/evolution/extension of the 802.11be standard as well as the 802.11be standard (i.e., the EHT standard).

According to an embodiment, the EHT PPDU may be configured to include an L-part and an EHT-part based on the frame format of the 802.11ax standard. An example of the configuration of the EHT PPDU may be described in FIG. 20.

Figure 20:
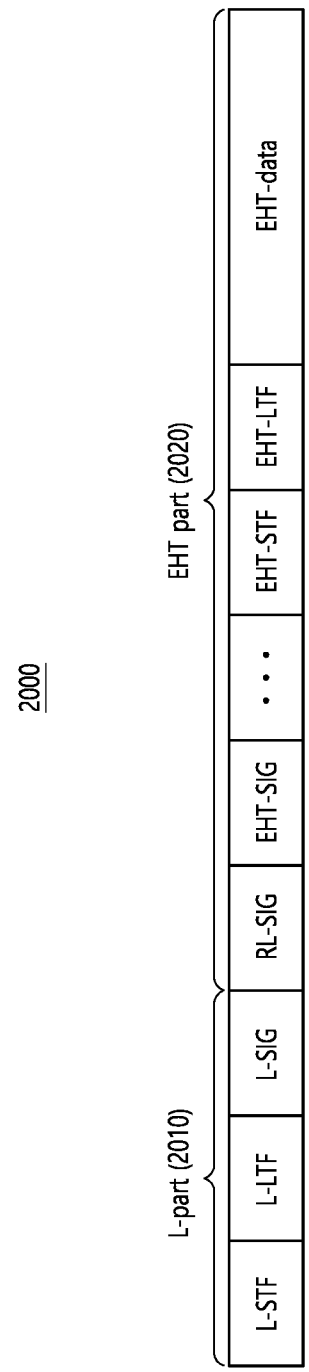
FIG. 20 shows an example of an EHT PPDU.

FIG. 20 shows an example of an EHT PPDU.

Referring to FIG. 20, the EHT PPDU 2000 may be configured by using a frame of a PPDU defined based on the 802.11ax standard. The EHT PPDU 2000 may include an L-part 2010 and an EHT-part 2020.

The EHT PPDU 2000 may be configured in a structure in which the L-part 2010 is first transmitted before the EHT-part 2020 for coexistence with the legacy STA (e.g., STAs according to the 802.11n/ac/ax standard).

According to an embodiment, same as the frame format of the 802.11ax standard, the EHT part 2020 may include the RL-SIG, EHT control field (e.g., U-SIG (not shown) and/or EHT-SIG), EHT-STF, EHT-LTF, and EHT-data field According to an embodiment, the RL-SIG may be omitted/skipped in the EHT part 2020. That is, the EHT part 2020 may include the EHT control field (e.g., U-SIG (not shown) and/or EHT-SIG), EHT-STF, EHT-LTF, and EHT-data field.

According to an embodiment, when a signal is transmitted through the EHT PPDU 2000 shown in FIG. 20, in order to reduce the packet false detection for a third party device (e.g., STAs of 802.11n/11ac/11ax standard) and to support the packet indication for the PPDU, then EHT control field (or EHT signal field) may be variously proposed/configured.

For example, the EHT signal field may be configured as three separate fields. As an example, the EHT signal field may include EHT-SIG1, EHT-SIG2 and/or EHT-SIG3. In other words, the EHT signal field may be composed of the EHT-SIG1, EHT-SIG2, and EHT-SIG3.

For example, among the EHT signal fields, the EHT-SIG1 and/or EHT-SIG2 may include common control information and/or information related to a future generation Wi-Fi standard. For example, the EHT-SIG3 may include user specific information.

For example, the EHT-SIG3 may be included in the EHT-SU/MU PPDU when transmitting an EHT PPDU (or EHT signal) for multiple users. Alternatively, the EHT-SIG3 may be included in the EHT-SU/MU PPDU to transmit the EHT PPDU (or EHT signal) to which preamble puncturing is applied.

According to an embodiment, the above-described SIG fields (e.g., the EHT-SIG1, EHT-SIG2, and EHT-SIG3) may be separately/individually encoded, and thus each of the SIG fields may include CRC bit(s) and tail bit(s).

For example, the EHT-SIG1 and EHT-SIG2 may be configured by applying MCS0 (i.e., BCC ½ and BPSK). For another example, the EHT-SIG3 may be configured by applying various MCSs. The indication information related to the MCS of the EHT-SIG3 may be transmitted through the EHT-SIG1 or EHT-SIG2. In other words, the EHT-SIG1 or EHT-SIG2 may include information related to the MCS of the EHT-SIG3.

Unlike the above-described embodiment, most common information and information related to power saving may be transmitted through EHT-SIG1. Accordingly, the EHT-SIG2 may be transmitted by applying various MCSs, not robust MCS (e.g., MCS0). Indication information related to the MCS of the EHT-SIG2 may be transmitted through the EHT-SIG1. In other words, the EHT-SIG1 may include information related to the MCS of the EHT-SIG2.

Figure 21:
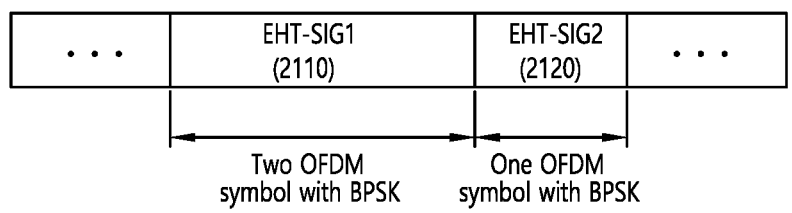
FIG. 21 shows an example of an EHT signal field.

FIG. 21 shows an example of an EHT signal field.

Referring to FIG. 21, the EHT signal field may include EHT-SIG1 2110 and EHT-SIG2 2120. Although not shown, the EHT signal field may further include EHT-SIG3. For example, the EHT-SIG1 2110 and the EHT-SIG2 2120 may each consist of 1 or 2 symbols. As an example, the EHT-SIG1 2110 may consist of 2 symbols. In addition, the EHT-SIG2 2120 may consist of 1 or 2 symbols.

Hereinafter, information included in the EHT-SIG1, EHT-SIG2, and EHT-SIG3 included in EHT-SIG may be described. The EHT-SIG1, EHT-SIG2, and EHT-SIG3 included in the above-described EHT-SIG are exemplary and may be named variously. For example, the EHT-SIG1, EHT-SIG2 and EHT-SIG3 may be named Pre-SIG (or U-SIG), EHT-SIGA and EHT-SIGB, respectively.

1. EHT-SIG1 Configuration
   A. According to an embodiment, the EHT-SIG1 may be positioned after the RL-SIG. The EHT-SIG1 may include information related to the next version, future version, or future Wi-Fi.
   B. According to an embodiment, the EHT-SIG1 may include various types of information. Hereinafter, examples of the various information that may be included in the EHT-SIG1 may be described. According to an embodiment, the EHT-SIG1 may include information required to interpret the EHT PPDU. According to an embodiment, the EHT-SIG1 may include at least some or all of information fields included in HE-SIGA of 802.11ax.
   B-i) Information related to Packet indication (or PHY identifier)

Information related to the packet indication (or PHY identifier) may be configured as 3-bit information. Information related to the Packet indication (or PHY identifier) may be used for an indication (indication) regarding the 802.11be standard (i.e., EHT standard) and a future version. In other words, the information related to the Packet indication (or PHY identifier) may include information related to the 802.11be standard (i.e., EHT standard) and a future version.

B-ii) Information related to Frame format indication

Information related to the frame format indication may has a length of 2 or 3 bits. Information related to the frame format indication may be used for an indication of the PPDU format. In other words, the information related to the frame format indication may include information related to the format of the PPDU.

B-ii)-1. Unlike the 802.11ax standard, a value of the length field of the EHT PPDU (e.g., L-SIG of the EHT PPDU) may be divided by three. In other words, when a value of the length field of the EHT PPDU is divided by 3, the remainder may be zero '0'. In other words, the result of the 'modulo 3 (mod 3)' operation to a value of the length field of the EHT PPDU may be set to zero (0). Therefore, since early indication for the format using the length field of the EHT PPDU cannot be performed, the format indication bit(s) may be included in the EHT-SIG1 to indicate the format.
   B-ii)-2. Information indicated based on the size of the format indication bit(s) may be set differently.
   B-ii)-2-a. For example, the format indication bit(s) may be set to 2 bits. Format indication bit(s) may be used for four format indications.

For example, when the Format indication bit(s) is set to '00', the format indication bit(s) may indicate the SU PPDU. Alternatively, when the format indication bit(s) is set to '00', the EHT PPDU may be set to the SU PPDU.

As an example, when the format indication bit(s) is set to '01', the format indication bit(s) may indicate an extended range (ER)-SU PPDU. Alternatively, when the format indication bit(s) is set to '01', the EHT PPDU may be set to the ER-SU PPDU.

For example, when the format indication bit(s) is set to '10', the format indication bit(s) may indicate a Trigger based (TB) PPDU. Alternatively, when the format indication bit(s) is set to '10', the EHT PPDU may be set to a TB PPDU.

For example, when the format indication bit(s) is set to '11', the format indication bit(s) may indicate the MU PPDU. Alternatively, when the format indication bit(s) is set to '11', the EHT PPDU may be set to the MU PPDU.

B-ii)-2-b. For example, the Format indication bit(s) may be set to 3 bits. Format indication bit(s) may be used for an indication for a newly defined format in the four format indication (format indication) and future version.
   B-ii)-2-c. According to an embodiment, one unified PPDU format may be used for SU or MU. In this case, the Format indication bit(s) may include information (or indication information) regarding the configuration of EHT-SIG2 or EHT-SIG3 transmitted/received after EHT-SIG1. For example, if the Format indication bit(s) is set to indicate SU, the SIG3 contiguous to the SIG1 may be configured not to include a user specific field.
   B-iii) Information related to bandwidth (BW)
   B-iii)-1. Information related to a bandwidth (BW) may be used to indicate a bandwidth of 20 MHz to 320 MHz. In other words, information related to the bandwidth (BW) may include information for indicating a bandwidth of 20 MHz to 320 MHz. Information related to the bandwidth (BW) may also indicate a bandwidth to which preamble puncturing is considered/applied. In other words, information related to the bandwidth (BW) may include information for indicating a bandwidth to which preamble puncturing is considered/applied.
   B-iii)-2. In consideration of a bandwidth to which preamble puncturing is applied (or to which preamble puncturing is applied), information related to the bandwidth (BW) may has a size of one of 4 to 6 bits.
   B-iii)-3. Unlike the above-described embodiment, the bandwidth may be indicated in the EHT-SIG1 and EHT-SIG⅔, respectively. In other words, the bandwidth-related information may be included in the EHT-SIG1 and EHT-SIG⅔.

For example, the EHT-SIG1 may indicate whether the EHT PPDU is transmitted over a wide bandwidth. In other words, the EHT-SIG1 may include information related to whether the EHT PPDU is transmitted over a wide bandwidth. As an example, the EHT-SIG1 may include information related to whether a bandwidth of the EHT PPDU is 160 MHz or more (or 240, 320 MHz or more). In addition, information related to a specific bandwidth may be included in the EHT-SIG2 or EHT-SIG3.

For example, the first information related to the bandwidth included in the EHT-SIG1 may indicate whether the EHT PPDU is transmitted over a wide bandwidth (wide bandwidth). Information related to the bandwidth included in the EHT-SIG1 may consist of 1 or 2 bits. The second information related to the bandwidth included in the EHT-SIG2 or EHT-SIG3 may be configured with 4 or 5 bits in consideration of multiple RUs and preamble puncturing.

B-iv) Information related to Functionality/Mode indication

Information related to the functionality/mode indication may be configured as 1 or 2 bits. Specifically, the information related to the functionality/mode indication may include information related to the functionality/mode used for transmission of the EHT PPDU. Information related to the functionality/mode indication may be used to indicate HARQ, multilink, and/or multi-AP transmission.

B-v) Tail bits

Tail bits may consist of 6 bits.

B-vi) CRC bits

CRC bits may consist of 4 bits.

B-vii) Information related to MCS of EHT-SIG3

B-vii)-1. When the same format is used for SU/MU transmission, or when an MU PPDU (i.e., a PPDU in which EHT-SIG1 is transmitted followed by EHT-SIG3) is transmitted, information related to the MCS of EHT-SIG3 may be included in the U-SIG (or EHT-SIG1).

B-vii)-2. Information related to the MCS of the EHT-SIG3 may be used to indicate various MCSs applied to the EHT-SIG3. In other words, information related to the MCS of the EHT-SIG3 may include information related to various MCSs applied to the EHT-SIG3. For example, information related to the MCS of the EHT-SIG3 may be configured/defined with 2 to 3 bits. As an example, the available MCS may be set to MCS0 to MCS5.

B-viii) Information related to Dual Carrier Modulation (DCM) of EHT-SIG3

The information related to the MCS of the EHT-SIG3 may indicate whether the DCM is used/applied to the EHT-SIG3. In other words, the information related to the MCS of the EHT-SIG3 may include information related to whether DCM is used/applied to the EHT-SIG3.

B-ix) Remaining bits other than the above-described information in the EHT-SIG1 may be composed of at least some or all of information fields defined in HE-SIGA of the conventional 802.11ax standard.

B-ix)-1. 11ax HE-SIGA field in SU case

For SU case, the 11ax HE-SIGA field may include various information (fields). For example, in the SU case, 11ax HE-SIGA field may include information related to: beam change; MCS; DCM; spatial reuse; GI+LTF; NSTS and MP; Coding; LDPC Extra symbol; STBC; Beamformed; Pre-FEC padding; PE Disambiguity and/or doppler.

B-ix)-2. 11ax HE-SIGA field in MU case

For MU case, the 11ax HE-SIGA field may include various information (fields). For example, in MU case, the 11ax HE-SIGA field may include information related to: SIGB-MCS; SIGB-DCM; SR; Number of SIGB symbols or MU-MIMO users; SIB compression; GI+LTF; Doppler; number of LTF symbols and MP; LDPC Extra symbol; STBC; Pre-FEC padding; and/or PE Disambiguity.

B-ix)-3. 11ax HE-SIGA field in ER-SU case

For ER-SU case, the 11ax HE-SIGA field may include various information (fields). For example, in the ER-SU case, the 11ax HE-SIGA field may include information related to: beam change; MCS; DCM; spatial reuse; GI+LTF; NSTS and MP; Coding; LDPC Extra symbol; STBC; Beamformed; Pre-FEC padding; PE Disambiguity; and/or doppler.

B-ix)-4. 11ax HE-SIGA field in TB case

For TB case, the 11ax HE-SIGA field may include information related to SR1, SR2, SR3, and/or SR4.

2. EHT-SIG2 Configuration

A. The EHT-SIG2 may be configured based on a combination of information (fields) included in the HE-SIGA of 802.11ax standard. For example, the combination of information (fields) included in HE-SIGA of the 802.11ax standard may consist of information not included in the EHT-SIG1.

B. EHT-SIG2 may include CRC bits (4 bits) and tail bits (6 bits).

C. EHT-SIG2 may include allocation information for allocating resources for multiple RUs, multiple BWs and/or preamble puncturing for a single user (SU).

C-i) The allocation information may be configured as 8 bits (or 8-bit table). The configuration of the allocation information in the 8-bit table is exemplary and may be configured in various ways. For example, in consideration of signaling overhead, the allocation information may be configured with 4 or 6 bits (or 4 or 6 bit tables).

C-ii) Considering that different NSSs are used, information related to NSS may be further included in the EHT-SIG2.

D. Unlike the above-described "C", the EHT-SIG2 may include RU allocation information for OFDMA transmission. In this case, the EHT-SIG2 may consist of 1 or 2 symbols.

D-i) Information included in the common field of the HE-SIGB of the 802.11 standard (e.g., information related to NSTS and RU allocation) may be included in the EHT-SIG2 and may be transmitted through the EHT-SIG2.

E. Common control information (e.g., version dependent information) not included in the EHT-SIG1 and information related to a STA (e.g., common field information) may be included in the EHT-SIG2. In other words, common control information overflowed from the EHT-SIG1 may be included in the EHT-SIG2. The common control information may include information related to transmission of the EHT PPDU. In addition, the EHT-SIG2 may include information related to the STA. Among the information related to the STA, common field information may include (RU) allocation information.

F. The format indication bit included in the EHT-SIG1 may be transmitted through the EHT-SIG2.

G. The EHT-SIG2 may include an indication bit for transmission granularity of the EHT-SIG3 including user information. In other words, the EHT-SIG2 may include information related to the transmission granularity of the EHT-SIG3 including User information.

G-i) For example, the granularity of the EHT-SIG3 may be set based on two granularities. In this case, the EHT-SIG3 channel may be configured in units of 20 MHz or 40 MHz.

G-ii) The 40 MHz granularity may be used when transmitting a large bandwidth (e.g., 240 MHz or 320 MHz).

H. The EHT-SIG2 may be transmitted based on MCS0 or various MCS (various MCS).

3. EHT-SIG3 Configuration

A. The EHT-SIG3 may be configured to include the same information as the HE-SIGB described below. That is, the EHT-SIG3 may include a common field and a user specific field. The user specific field may be configured based on at least a part of information of the user field described below.

A-i) flax HE-SIGB field for OFDMA

The EHT-SIG3 may include at least some or all of information (fields) included in the 11ax HE-SIGB field for OFDMA. For example, the EHT-SIG3 may include information related to STA-ID, NSTS, beamformed, MCS, DCM and/or Coding.

A-ii) flax HE-SIGB field for MU-MIMO

The EHT-SIG3 may include at least some or all of information (fields) included in the 11ax HE-SIGB field for MU-MIMO. For example, the EHT-SIG3 may include information related to STA-ID, Spatial Configuration, MCS, and/or Coding.

A-iii) The EHT-SIG3 may be configured to include information related to multiple RU allocation in addition to the above information.

B. The EHT-SIG3 may be included in an EHT PPDU (or EHT frame) when transmitting a signal to multiple STAs. In addition, the EHT-SIG3 may be included in MU PPDU transmission to configure a PPDU (i.e., EHT PPDU).

C. Unlike the above example, the SU/MU PPDU may be formed/configured in a unified PPDU format. In this case, the EHT-SIG3 may be transmitted while being included in a PPDU (i.e., EHT PPDU) even during SU transmission.

C-i) For SU transmission, the EHT-SIG3 may be configured only with a common field, unlike the MU transmission.

C-ii) The common field may be configured as version dependent information and common information bits. Also, the common field may be encoded including one CRC field and one tail bit field. For example, the version dependent information may be configured as common control information not included in the EHT-SIG1 (e.g., U-SIG).

C-iii) Even for SU transmission, various MCSs (various MCSs) may be applied to the EHT-SIG (e.g., EHT-SIG3). Indication related to the MCS of the EHT-SIG3 may be performed in the EHT-SIG1. In other words, information related to the MCS of the EHT-SIG3 may be included in the EHT-SIG1.

C-iv) Also, size information for the EHT-SIG (e.g., EHT-SIG3) may be indicated through the EHT-SIG1. For example, the number of OFDM symbols used for the EHT-SIG (e.g., EHT-SIG3) may be indicated through the EHT-SIG1. In other words, size information for the EHT-SIG (e.g., EHT-SIG3) may be included in the EHT-SIG1. For example, information related to the number of OFDM symbols used in the EHT-SIG (e.g., EHT-SIG3) may be included in the EHT-SIG1.

D. According to an embodiment, the EHT-SIG may include the EHT-SIG1, EHT-SIG2 and EHT-SIG3. When the EHT-SIG2 includes allocation information included in the common field, EHT-SIG3 may be configured with the remaining information except for the allocation information.

D-i) For example, the EHT-SIG3 may be configured only with user specific information excluding the common field of the HE-SIGB.

E. According to an embodiment, the EHT-SIG3 may include a common field and a user specific field. The common field and the user specific field may include CRC bit(s) and tail bit(s), respectively, and may be separately/individually encoded.

F. According to an embodiment, the EHT-SIG3 may be configured to include information (e.g., version dependent information) of the EHT-SIG2. In other words, the EHT-SIG3 may include at least a part or all of information (fields) included in the EHT-SIG2.

For example, information included in the EHT-SIG2 may be included in a common field of the EHT-SIG3. In addition, in order to reduce signaling overhead, one CRC field and one tail bit field may be applied (and jointly encoded) to information of EHT-SIG2 and information of the common field, thereby configuring the common field. In other words, in addition to the common field, information included in the EHT-SIG2 may be further included. The common field may be jointly encoded with one CRC field and one tail bit field.

According to an embodiment, the EHT PPDU may include a first signal field and a second signal field. For example, the first signal field may include U-SIG. The U-SIG may include the above-described EHT-SIG1.

For example, the second signal field may include EHT-SIG. The EHT-SIG may include the common field and the user specific field. The common field may be called by various names. The common field may be referred to as a transmission information field.

As an example, the EHT-SIG may include the above-described EHT-SIG2 and EHT-SIG3. The common field may include the EHT-SIG2. The user specific field may include the EHT-SIG3.

As another example, when the EHT-SIG3 includes all of the above-described information (fields) of the EHT-SIG2, the EHT-SIG may include the EHT-SIG3. The EHT-SIG3 may be configured as the common field and the user specific field.

Configuration of EHT PPDU

The above-described EHT-SIG (e.g., EHT-SIG1, EHT-SIG2, EHT-SIG3) may be applied to configure an EHT PPDU. The EHT PPDU may be configured in various formats. For example, the EHT PPDU may be configured in an SU PPDU format, an MU PPDU format, an ER SU PPDU format, and/or a TB PPDU format. Hereinafter, the configuration of the SU PPDU format, the MU PPDU format, the ER SU PPDU format, and the TB PPDU format may be sequentially described.

Configuration of SU PPDU Format

A. The SU PPDU may be a format of a PPDU transmitted to a single user. For example, the SU PPDU may be configured as shown in FIG. 22.

FIG. 22 shows an example of the configuration of an SU PPDU.

Referring to FIG. 22, the SU PPDU 2200 may include EHT-SIG1 2210 and EHT-SIG2 2220. For example, the same MCS may be applied to the EHT-SIG1 2210 and the EHT-SIG2 2220 for transmission of the SU PPDU 2200. As another example, various MCSs may be applied to the EHT-SIG2 2220 for transmission of the SU PPDU 2200.

B. Unlike FIG. 22, the SU PPDU may include EHT-SIG3 for MU transmission in order to support multiple RU aggregation and preamble puncturing transmission. That is, SU transmission may be performed using the MU PPDU. In this case, a single PPDU for SU/MU transmission may be configured. An example of a PPDU for SU/MU transmission may be described with reference to FIG. 23.

FIG. 23 shows another example of the configuration of an SU PPDU.

Referring to FIG. 23, the SU PPDU 2300 may be used not only for transmission for a single user (SU), but also for transmission for a multi user (MU). The SU PPDU 2300 may include EHT-SIG1 2310 and EHT-SIG3 2330.

B-i) The EHT-SIG3 2330 may consist of a common field and a user field. The user field may be configured to include the same STA ID for multiple RU aggregation. When transmitting through preamble puncturing, the EHT-SIG3 2330 may be configured to include only one user field. That is, even when the EHT PPDU is transmitted to a single user, the user field may be included in the EHT-PPDU for transmission.

B-ii) In an embodiment different from B-i), the EHT-SIG3 2330 may be configured to include only a common field. For example, the common field may include version dependent information, information related to Nsts, and/or information related to RU allocation.

B-ii)-1. The information related to the RU allocation may include allocation information for multiple RUs and/or preamble puncturing.

B-ii)-2. The common field may be encoded including one CRC field and one tail bit field.

B-iii) When one PPDU format is used to support both SU and MU, whether SU/MU is supported may be indicated through the PPDU format indication transmitted through the EHT-SIG1. In other words, information related to whether SU/MU is supported may be included in the PPDU format indication of the EHT-SIG1. In other words, the receiving STA may check whether the received EHT PPDU is a PPDU for SU or MU based on the PPDU format indication of the EHT-SIG1.

B-iv) In addition, the receiving STA may confirm/check that EHT-SIG3 is configured differently through the PPDU format indication. In other words, the receiving STA may confirm/check whether SU transmission and MU transmission are applied based on the PPDU format indication, and the receiving STA may confirm/check that the EHT-SIG3 is configured differently based on the PPDU format indication.

B-v) According to an embodiment, the transmission method of the EHT-SIG3 may be set differently according to SU/MU transmission. For example, in SU transmission, when the EHT-SIG3 is transmitted through a bandwidth of 20 MHz or more, it may be transmitted by being duplicated in units of 20 MHz (or 40 MHz). In MU transmission, the EHT-SIG3 may be separately/individually configured with two 20 MHz, and then duplicated in units of 40 MHz for transmission. Accordingly, the PPDU format indication bit may indicate SU/MU classification, EHT-SIG3 configuration of the PPDU, and transmission method of the EHT-SIG3. In other words, the PPDU format indication bit may include information for SU/MU classification, information related to the EHT-SIG3 configuration of the PPDU, and information related to the transmission method of the EHT-SIG3.

Configuration of MU PPDU Format

A. The MU PPDU may be a format of a PPDU transmitted to multiple users. For example, the MU PPDU may be configured as shown in FIG. 24.

FIG. 24 shows an example of the configuration of an MU PPDU.

Referring to FIG. 24, the MU PPDU 2400 may include EHT-SIG1 2410, EHT-SIG2 2420, and EHT-SIG3 2430.

A-i) The EHT-SIG2 2420 and EHT-SIG3 2430 may be transmitted by applying various MCSs. Information related to the MCS(s) of EHT-SIG2 2420 and EHT-SIG3 2430 may be indicated through bits of the EHT-SIG1 2410 and EHT-SIG2 2420, respectively. In other words, information related to the MCSs of EHT-SIG2 2420 and EHT-SIG3 2430 may be included in the EHT-SIG1 2410 and EHT-SIG2 2420, respectively. For example, information related to the MCS of the EHT-SIG2 2420 may be included in the EHT-SIG1 2410.

Information related to the MCS of the EHT-SIG3 2430 may be included in the EHT-SIG2 2420.

A-ii) Unlike the above-described example (A-i), the EHT-SIG1 2410 and EHT-SIG2 2420 may be commonly modulated based on 'MCS0'. In other words, the EHT-SIG1 2410 and EHT-SIG2 2420 may each be modulated based on the MCS0.

B. Unlike FIG. 24 described above, the MU PPDU may be configured to include the EHT-SIG1 and EHT-SIG3. That is, unlike FIG. 24, the EHT-SIG2 may be omitted from the MU PPDU. An example in which the EHT-SIG2 is omitted in the MU PPDU may be described with reference to FIG. 25.

Figure 25:
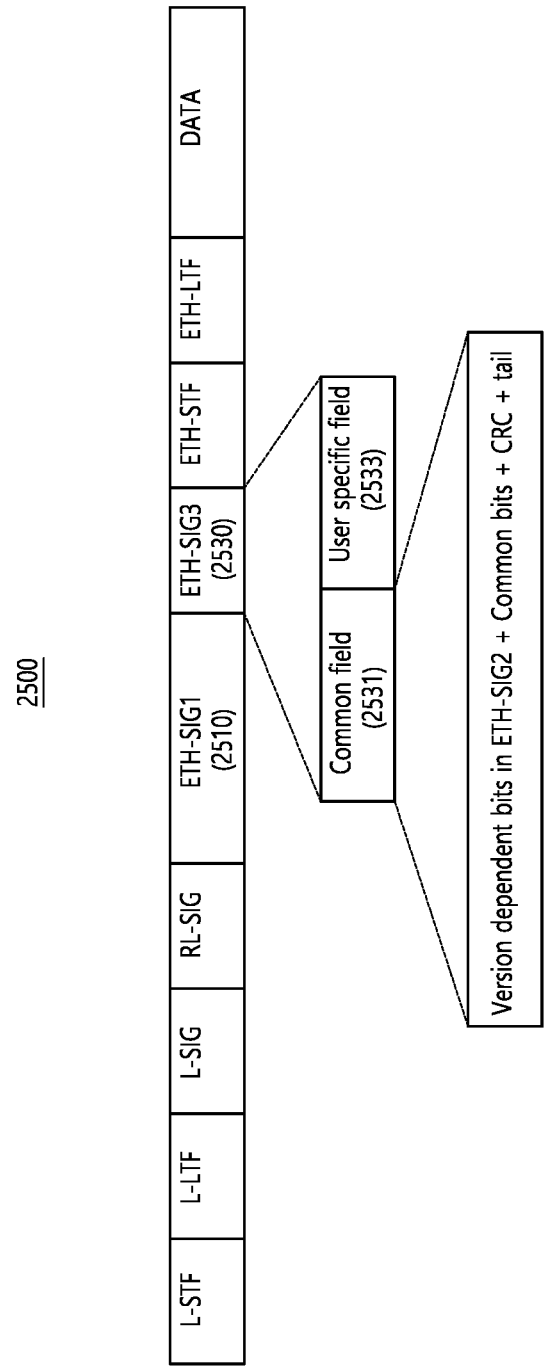
FIG. 25 shows another example of the configuration of an MU PPDU.

FIG. 25 shows another example of the configuration of an MU PPDU.

Referring to FIG. 25, the MU PPDU 2500 may include EHT-SIG1 2510 and EHT-SIG3 2530. The EHT-SIG3 2530 may include a common field 2531 and a user specific field 2533. For example, the EHT-SIG3 2530 may include information (e.g., version dependent bits) included in the EHT-SIG2 described above. The information included in the above-described the EHT-SIG2 may be included in the common field 2531 of the EHT-SIG3 2530 for transmission.

B-i) For example, one CRC field and one tail bit field may be applied to configure the common field 2531. That is, the common field 2531 may include version dependent bits, common bits, CRC and tail (or tail bits).

As another example, the common field 2531 may be configured by applying each of the CRC field and tail field to version dependent information (or version dependent bits) and common bits in the common field 2531. That is, the common field 2531 may include version dependent bits, CRC for the version dependent bits, tail for the version dependent bits, common bits, CRC for the common bits, and tail for the common bits.

Configuration of TB PPDU Format

The TB PPDU may be a format of a PPDU transmitted in response to a trigger frame. For example, the TB PPDU may be configured as shown in FIG. 26 or FIG. 27.

FIG. 26 shows an example of the configuration of a TB PPDU.

A. Referring to FIG. 26, TB PPDU 2600 may be configured in the same format as the SU PPDU 2200 illustrated in FIG. 22. For example, the TB PPDU 2600 may include EHT-SIG1 2610 and EHT-SIG2 2620. The TB PPDU 2600 may include information related to the SR included in the HE-SIGA of the 802.11ax standard.

FIG. 27 shows another example of the configuration of a TB PPDU.

B. Referring to FIG. 27, unlike FIG. 26, TB PPDU 2700 may include only EHT-SIG1 2710 among the above-described EHT-SIGs (e.g., EHT-SIG1, EHT-SIG2 and EHT-SIG3).

The EHT-SIG1 2710 may include information related to a PHY identifier, format indication, BW and/or DL/UL, etc. as defined above. In addition, the EHT-SIG1 2710 may further include at least some or all of information (fields) included in the HE-SIGA of the TB PPDU of the 802.11ax standard.

According to an embodiment, the EHT-SIG1 2710 may consist of 2 symbols. In this case, the EHT-SIG1 2710 may not be enough to include new information (or new contents). For example, the new information may include information other than information included in the HE-SIGA of the TB PPDU of the 802.11ax standard.

Accordingly, in order to secure bits for new information, some information (or some contents) included in HE-SIGA may be excluded to configure EHT-SIG1 2710. For example, the EHT-SIG1 2710 may not include SR information (or information bits) among information included in HE-SIGA of the TB PPDU of the 802.11ax standard.

Configuration of ER SU PPDU Format

A. The ER SU PPDU may be a format of a PPDU used for range extension. In this case, the SIG field may be repeatedly transmitted to improve reliability of the SIG field. In addition, during ER-SU transmission, an L-STF and an L-LTF may be transmitted with 3 dB boosting. The ER SU PPDU may include the U-SIG.

B. In order to speed up the confirmation/recognition of the frame type, the U-SIG (e.g., EHT-SIG1) included in the ER SU PPDU may consist of one symbol, and the U-SIG may be repeatedly transmitted.

B-i) For example, the U-SIG may consist of 1 symbol. The U-SIG may be configured based on of a combination of the following information (fields).

B-i)-1. Information related to the PHY version identifier

Information related to the PHY version identifier may consist of 3 bits.

B-i)-2. Information related to frame format

Information related to the frame format may be used to indicate the PPDU format. The frame format may include a format of SU/MU/TB/ER (ER SU). In addition, the information related to the frame format may be set to 2 or 3 bits in consideration of the future PPDU type.

B-i)-3. Information related to BSS color

For example, information related to the BSS color may be configured as 6 bits similar to 802.11ax. For another example, the information related to the BSS color may be set to a size larger than 6 bits in order to clarify the identification of the BSS. For example, 7/8/9/10 bits, etc. may be used for the information related to the BSS color.

B-i)-4. Information related to TXOP

B-i)-5. Tail (or Tail bits)

The tail bits may be set to 6 bits.

B-i)-6. CRC

The CRC (or CRC bits) may be set to 4 bits.

B-ii) As in the above-described embodiment, the U-SIG may consist of one symbol. Accordingly, for SU transmission, among subfields included in the U-SIG, a subfield not included in one symbol U-SIG may be transmitted though the EHT-SIGA (e.g., EHT-SIG2). In this case, the EHT-SIGA may consist of 1 or 2 symbols.

B-ii)-a. For example, the EHT-SIGA consisting of 2 symbols may be transmitted as follows for repetition. Hereinafter, notation of "[ ]" may mean one symbol.

B-ii)-a-i) [EHT-SIGA1 and EHT-SIG2] [EHT-SIGA1 and EHT-SIG2]

The EHT-SIGA repeated in "B-ii)-a-i)" can be formed/configured by bypassing an interleaver.

B-ii)-a-ii) [EHT-SIGA1 and EHT-SIG1] [EHT-SIGA2 and EHT-SIG2]

C. An example of an ER SU PPDU including a SIG field according to the above-described embodiment may be described with reference to FIG. 28.

Figure 28:
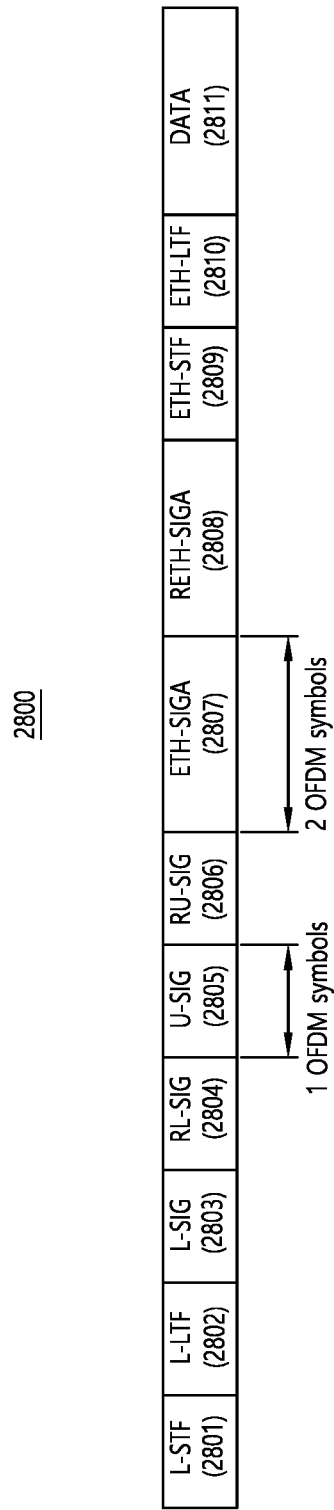
FIG. 28 shows an example of the configuration of an ER SU PPDU.

FIG. 28 shows an example of the configuration of an ER SU PPDU.

Referring to FIG. 28, ER SU PPDU 2800 may include L-STF 2801, L-LTF 2802, L-SIG 2803, RL-SIG 2804, U-SIG 2805, RU-SIG 2806, EHT-SIGA 2807, REHT-SIGA 2808, EHT-STF 2809, EHT-LTF 2810, and DATA 2811. For example, the U-SIG 2805 may consist of 1 symbol. The EHT-SIGA 2807 may consist of 2 symbols. As an example, the RU-SIG 2806 may be configured by repeating the U-SIG 2805. For example, the REHT-SIGA 2808 may be configured by repeating the EHT-SIGA 2807.

D. Unlike the above-described embodiment, the U-SIG (e.g., EHT-SIG1) may consist of 2 symbols. The U-SIG configured as the two symbols may be repeated in various ways. An example in which the U-SIG composed of the two symbols is repeated may be described below.

D-i) For example, since the U-SIG is composed of two symbols, U-SIG may be composed of U-SIG1 and U-SIG2. The U-SIG1 may be transmitted by including information related to the PHY identification and frame format indicator. The U-SIG1 can be configured by bypassing an interleaver in order to quickly acquire information related to the PHY identify and frame format indicator. And, the U-SIG2 can be configured by applying an interleaver.

D-ii) Configuration of U-SIG for ER SU PPDU

D-ii)-1. For example, the U-SIG may be configured in the order of the U-SIG1 (first symbol), repeated U-SIG1, U-SIG2 (second symbol), and repeated U-SIG2.

D-ii)-2. For example, the U-SIG may be configured in the order of the U-SIG1, U-SIG2, repeated U-SIG1, and repeated U-SIG2.

The repeated U-SIG1 or repeated U-SIG2 in D-ii)-1 and D-ii)-2 can be configured by bypassing an interleaver.

E. The ER SU PPDU according to the above-described embodiment may be configured as shown in FIG. 29 or FIG. 30.

Figure 29:
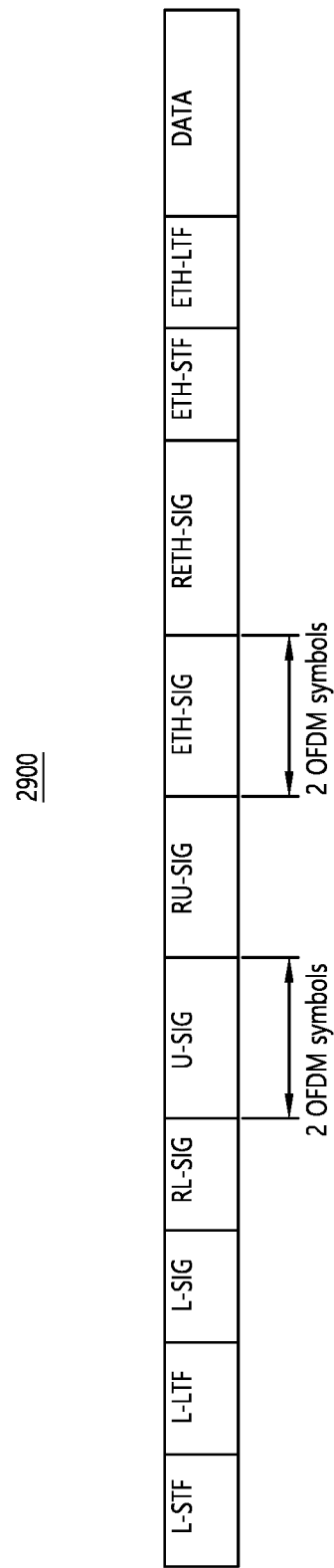
FIG. 29 shows another example of the configuration of an ER SU PPDU.

FIG. 29 shows another example of the configuration of an ER SU PPDU.

Referring to FIG. 29, ER SU PPDU 2900 may include L-STF, L-LTF, L-SIG, RL-SIG, U-SIG, RU-SIG, EHT-SIG, REHT-SIG, EHT-STF, EHT-LTF, and DATA. The U-SIG may consist of 2 symbols. The RU-SIG may be configured by repeating the U-SIG. The REHT-SIG may be configured by repeating the EHT-SIG.

Figure 30:
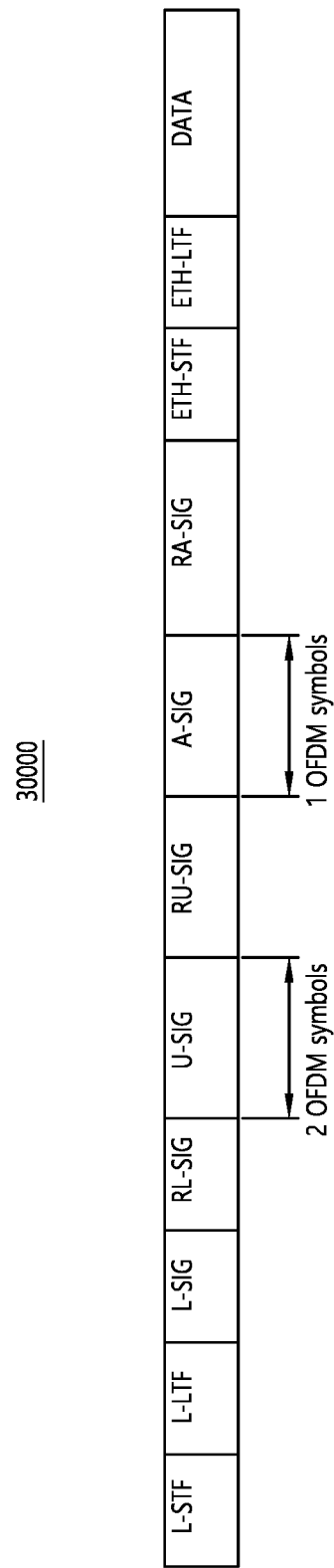
FIG. 30 shows another example of the configuration of an ER SU PPDU.

FIG. 30 shows another example of the configuration of an ER SU PPDU.

Referring to FIG. 30, ER SU PPDU 3000 may include L-STF, L-LTF, L-SIG, RL-SIG, U-SIG, RU-SIG, A-SIG, RA-SIG, EHT-STF, EHT-LTF, and DATA. For example, the A-SIG may consist of 1 symbol. The A-SIG may include at least a portion of the EHT-SIG of FIG. 29. In addition, the A-SIG may further include additional information for the extended range. The RA-SIG may be configured by repeating the A-SIG.

Figure 31:
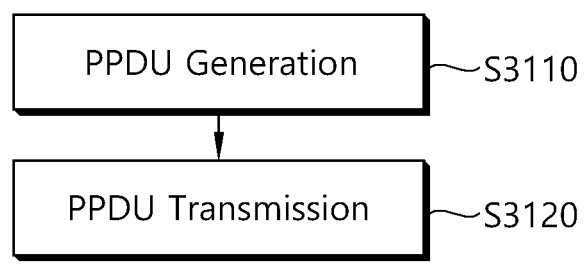
FIG. 31 is a flowchart for explaining an operation of a transmitting STA.

FIG. 31 is a flowchart for explaining an operation of a transmitting STA.

Referring to FIG. 31, in step S3110, the transmitting STA may generate a PPDU. For example, the PPDU may include an EHT PPDU.

According to an embodiment, the PPDU may include a first signal field and a second signal field.

For example, the first signal field and the second signal field may be respectively encoded. As an example, in the first signal field, two symbols may be jointly encoded. In addition, the first signal field and the second signal field may be modulated, respectively.

For example, the first signal field may include the U-SIG. For example, the second signal field may include the EHT-SIG.

According to an embodiment, the PPDU may further include an L-SIG field and a RL-SIG field. For example, the RL-SIG field may be contiguous to the L-SIG field. For example, the first signal field may be contiguous to the RL-SIG field. For example, the second signal field may be contiguous to the first signal field.

For example, the transmitting STA may set a value of a length field of the L-SIG field based on a transmission time of the PPDU. As an example, a result of 'modulo 3' operation for the value of the length field of the L-SIG field may be set to zero (0).

For example, the RL-SIG field may be configured such that the L-SIG field is repeated. For example, the RL-SIG field includes the same information field as the L-SIG field, and may be modulated in the same manner. The L-SIG field and the RL-SIG field may be modulated through BPSK, respectively.

According to an embodiment, the first signal field may include first information related to a version of the PPDU. The first information may be determined based on whether the PPDU is an EHT PPDU.

For example, the first information related to a Physical Layer (PHY) version of the PPDU may be configured as 3-bit information. The first information may include information indicating that the PPDU is a PPDU (i.e., an EHT PPDU) based on the EHT standard. In addition, the first information may include information for classifying a PPDU according to a new standard defined after the 802.11be standard (i.e., the EHT standard). In other words, the first information may include information for classifying a PPDU based on an EHT standard and a PPDU based on a standard determined/generated/established after the EHT standard. That is, the first information may include information indicating that the PPDU is a PPDU in compliance with an EHT standard or a PPDU in compliance with the EHT standard.

According to an embodiment, the type of the PPDU and the version of the PPDU may be used separately. The type of PPDU may be used to classify the PPDU according to the EHT standard and the standard before the EHT standard (e.g., 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a PHY version, a Packet version, a Packet identifier, and a Wi-Fi version.

According to an embodiment, the first signal field may further include information related to a basic service set (BSS) color and information related to a transmission opportunity (TXOP). For example, the information related to the BSS color may be set as various bit information. As an example, the information related to the BSS color may be set as 6-bit information. For example, the information related to the TXOP may be set to various bit information. As an example, information related to TXOP may be set as 7-bit information.

According to an embodiment, the first signal field may include at least one of: information related to whether Hybrid Automatic Repeat Request (HARQ) is applied to the PPDU; information related to whether multi-link transmission is applied to the PPDU; and information related to whether multi-access point (multi-AP) transmission is applied to the PPDU.

According to an embodiment, the second signal field may include second information which is related to transmission of the PPDU which is configured based on the first information. The second information may be referred to by various names. For example, the second information may be referred to as version dependent information.

For example, the second information may include transmission information dependent on a version of the PPDU. In other words, the configuration of information included in the second information may be set differently based on the version of the PPDU. For example, when the version of the PPDU corresponds to the EHT standard (i.e., when the PPDU is an EHT PPDU), the second information may include at least one of: information related to a size of a long training field (LTF); information related to a number of symbols of the LTF; information related to a Low Density Parity Check Code (LDPC) extra symbol; information related to a pre-forward error correction (FEC) padding factor; and information related to a packet extension (PE).

For example, the second information may include overflow information overflowed from the first signal field. For example, the first signal field may include information independent of the version of the PPDU and information dependent on the version of the PPDU. Information dependent on the version of the PPDU may be included in the second signal field by being overflowed from the first signal field.

According to an embodiment, the second signal field may include a common field and a user specific field. The common field may be called by various names. The common field may be referred to as a transmission information field. For example, the second information may be included in the common field. The common field may further include common information related to the user (e.g., information related to RU allocation). In other words, the common field may include information (e.g., second information) related to transmission of the PPDU. In addition, the common field may further include common information related to the user (e.g., information related to RU allocation) in addition to information related to PPDU transmission (e.g., second information).

For example, the second signal field may be configured for multiple users. The user specific field may include information related to multiple users. As an example, the user specific field may include information necessary for each multi-user. When the multi-user includes the first user and the second user, the user specific field may include a subfield for the first user and a subfield for the second user.

For another example, the second signal field may be configured for a single user. For example, when the PPDU is transmitted for a single user, the second signal field may be configured for a single user. As an example, the second signal field may be configured to be duplicated in units of 20 MHz. In other words, the second signal field may be configured by being duplicated in units of 20 MHz within the bandwidth of the PPDU. That is, when the PPDU is transmitted for a single user, the second signal field may be repeatedly configured in units of 20 MHz. In other words, based on the PPDU being configured/transmitted for a single user, the second signal field may be repeatedly configured/transmitted in units of 20 MHz.

For example, even when the PPDU is transmitted for a single user, the second signal field may include a common field and a user specific field. However, when the PPDU is transmitted for a single user, detailed field values of the common field and the user specific field may be changed.

As an example, the user specific field may be configured to include the same STA-ID. As another example, the user specific field may include only a subfield for a single user. As another example, the common field of the second signal field may include information indicating that the second signal field is configured for a single user.

For example, each of a common field and a user-specific field may be separately/individually encoded. As an example, the common field may include first cyclic redundancy check (CRC) bits and first tail bits for the common field. As an example, the user-specific field may include second CRC bits and second tail bits related to the user-specific field.

For example, the user specific field may be configured based on whether Orthogonal Frequency Division Multiplexing Access (OFDMA) or Multi User-Multiple Input Multiple Output (MU-MIMO) is applied. For example, when the OFDMA is applied, the user specific field may include information related to STA-ID (identifier), information related to number of space-time streams (NSTS), information related to whether beamforming is performed, information related to MCS, information related to whether Dual Carrier Modulation (DCM) is applied, and information related to coding. As another example, when the MU-MIMO is applied, the user specific field may include information related to STA-ID (identifier), information related to Spatial Configuration, information related to MCS, and information related to coding.

In step S3120, the transmitting STA may transmit a PPDU. According to an embodiment, each field included in the PPDU may be transmitted through a symbol. For example, the L-SIG field may be transmitted through the first symbol. The RL-SIG field may be transmitted through a second symbol contiguous to the first symbol. The first signal field may be transmitted through a third symbol contiguous to the second symbol. The second signal field may be transmitted through a fourth symbol contiguous to the third symbol.

As an example, the first symbol may consist of one symbol. The second symbol may consist of one symbol. The third symbol may consist of two symbols. Accordingly, the first signal field may be transmitted through two symbols. For example, the fourth symbol may consist of at least one or more symbols. Accordingly, the second signal field may be transmitted through at least one or more symbols contiguous to the two symbols through which the first signal field is transmitted.

Figure 32:
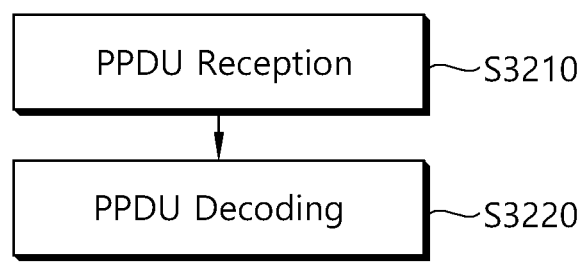
FIG. 32 is a flowchart illustrating an operation of a receiving STA.

FIG. 32 is a flowchart illustrating an operation of a receiving STA.

Referring to FIG. 32, in step S3210, a receiving STA may receive a PPDU.

According to an embodiment, the PPDU may include a first signal field and a second signal field.

For example, the first signal field and the second signal field may be respectively encoded. As an example, in the first signal field, two symbols may be jointly encoded. In addition, the first signal field and the second signal field may be modulated, respectively.

For example, the first signal field may include the U-SIG. For example, the second signal field may include the EHT-SIG.

According to an embodiment, the PPDU may further include an L-SIG field and a RL-SIG field. For example, the RL-SIG field may be contiguous to the L-SIG field. For example, the first signal field may be contiguous to the RL-SIG field. For example, the second signal field may be contiguous to the first signal field.

According to an embodiment, each field included in the PPDU may be received through a symbol. For example, the L-SIG field may be received through the first symbol. The RL-SIG field may be received through a second symbol contiguous to the first symbol. The first signal field may be received through a third symbol contiguous to the second symbol. The second signal field may be received through a fourth symbol contiguous to the third symbol.

As an example, the first symbol may consist of one symbol. The second symbol may consist of one symbol. The third symbol may consist of two symbols. Accordingly, the first signal field may be received through two symbols. For example, the fourth symbol may consist of at least one or more symbols. Accordingly, the second signal field may be received through at least one or more symbols contiguous to the two symbols through which the first signal field is received.

For example, the transmitting STA may set a value of a length field of the L-SIG field based on a transmission time of the PPDU. As an example, a result of 'modulo 3' operation for the value of the length field of the L-SIG field may be set to zero (0).

For example, the RL-SIG field may be configured such that the L-SIG field is repeated. For example, the RL-SIG field includes the same information field as the L-SIG field, and may be modulated in the same manner. The L-SIG field and the RL-SIG field may be modulated through BPSK, respectively.

According to an embodiment, the first signal field may include first information related to a version of the PPDU. The first information may be determined based on whether the PPDU is an EHT PPDU. The first information may include information related to whether the PPDU is an EHT PPDU. Accordingly, the receiving STA may confirm/check that the PPDU is an EHT PPDU based on the first information.

For example, the first information related to a Physical Layer (PHY) version of the PPDU may be configured as 3-bit information. The first information may include information indicating that the PPDU is a PPDU (i.e., an EHT PPDU) based on the EHT standard. In addition, the first information may include information for classifying a PPDU according to a new standard defined after the 802.11be standard (i.e., the EHT standard). In other words, the first information may include information for classifying a PPDU based on an EHT standard and a PPDU based on a standard determined/generated/established after the EHT standard. That is, the first information may include information indicating that the PPDU is a PPDU in compliance with an EHT standard or a PPDU in compliance with the EHT standard.

According to an embodiment, the type of the PPDU and the version of the PPDU may be used separately. The type of PPDU may be used to classify the PPDU according to the EHT standard and the standard before the EHT standard (e.g., 802.11n/ac/ax). On the other hand, the version of the PPDU may be used to distinguish the PPDU according to the EHT standard and the standard after the EHT standard. For example, the version of the PPDU may be called variously. For example, the version of the PPDU may be referred to as a PHY version, a Packet version, a Packet identifier, and a Wi-Fi version.

According to an embodiment, the first signal field may further include information related to a basic service set (BSS) color and information related to a transmission opportunity (TXOP). For example, the information related to the BSS color may be set as various bit information. As an example, the information related to the BSS color may be set as 6-bit information. For example, the information related to the TXOP may be set to various bit information. As an example, information related to TXOP may be set as 7-bit information.

According to an embodiment, the first signal field may include at least one of: information related to whether Hybrid Automatic Repeat Request (HARQ) is applied to the PPDU; information related to whether multi-link transmission is applied to the PPDU; and information related to whether multi-access point (multi-AP) transmission is applied to the PPDU.

According to an embodiment, the second signal field may include second information which is related to transmission of the PPDU which is configured based on the first information. The second information may be referred to by various names. For example, the second information may be referred to as version dependent information.

For example, the second information may include transmission information dependent on a version of the PPDU. In other words, the configuration of information included in the second information may be set differently based on the version of the PPDU. For example, when the version of the PPDU corresponds to the EHT standard (i.e., when the PPDU is an EHT PPDU), the second information may include at least one of: information related to a size of a long training field (LTF); information related to a number of symbols of the LTF; information related to a Low Density Parity Check Code (LDPC) extra symbol; information related to a pre-forward error correction (FEC) padding factor; and information related to a packet extension (PE).

For example, the second information may include overflow information overflowed from the first signal field. For example, the first signal field may include information independent of the version of the PPDU and information dependent on the version of the PPDU. Information dependent on the version of the PPDU may be included in the second signal field by being overflowed from the first signal field.

According to an embodiment, the second signal field may include a common field and a user specific field. The common field may be called by various names. The common field may be referred to as a transmission information field. For example, the second information may be included in the common field. The common field may further include common information related to the user (e.g., information related to RU allocation). In other words, the common field may include information (e.g., second information) related to transmission of the PPDU. In addition, the common field may further include common information related to the user (e.g., information related to RU allocation) in addition to information related to PPDU transmission (e.g., second information).

For example, the second signal field may be configured for multiple users. The user specific field may include information related to multiple users. As an example, the user specific field may include information necessary for each multi-user. When the multi-user includes the first user and the second user, the user specific field may include a subfield for the first user and a subfield for the second user.

For another example, the second signal field may be configured for a single user. For example, when the PPDU is transmitted for a single user, the second signal field may be configured for a single user. As an example, the second signal field may be configured to be duplicated in units of 20 MHz. In other words, the second signal field may be configured by being duplicated in units of 20 MHz within the bandwidth of the PPDU. That is, when the PPDU is transmitted for a single user, the second signal field may be repeatedly configured in units of 20 MHz. In other words, based on the PPDU being configured/transmitted for a single user, the second signal field may be repeatedly configured/transmitted in units of 20 MHz.

For example, even when the PPDU is transmitted for a single user, the second signal field may include a common field and a user specific field. However, when the PPDU is transmitted for a single user, detailed field values of the common field and the user specific field may be changed.

As an example, the user specific field may be configured to include the same STA-ID. As another example, the user specific field may include only a subfield for a single user. As another example, the common field of the second signal field may include information indicating that the second signal field is configured for a single user.

For example, each of a common field and a user-specific field may be separately/individually encoded. As an example, the common field may include first cyclic redundancy check (CRC) bits and first tail bits for the common field. As an example, the user-specific field may include second CRC bits and second tail bits related to the user-specific field.

For example, the user specific field may be configured based on whether Orthogonal Frequency Division Multiplexing Access (OFDMA) or Multi User-Multiple Input Multiple Output (MU-MIMO) is applied. For example, when the OFDMA is applied, the user specific field may include information related to STA-ID (identifier), information related to number of space-time streams (NSTS), information related to whether beamforming is performed, information related to MCS, information related to whether Dual Carrier Modulation (DCM) is applied, and information related to coding. As another example, when the MU-MIMO is applied, the user specific field may include information related to STA-ID (identifier), information related to Spatial Configuration, information related to MCS, and information related to coding.

In step S3220, the receiving STA may decode the PPDU. According to an embodiment, the receiving STA may decode PPDUs based on the first signal field and the second signal field. In addition, the receiving STA may decode the first signal field and the second signal field, respectively.

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chip(s) 114 and/or 124 of FIG. 1, or implemented based on the processor(s) 111 and/or 121 and the memory(s) 112 and/or 122 of FIG. 1, or may be implemented based on the processor 610 and the memory 620 of FIG. 19. For example, an apparatus of the present specification may comprise a processor; and a memory coupled to the processor, wherein the processor is configured to: receive a Physical Layer Protocol Data Unit (PPDU), wherein the PPDU includes a first signal field and a second signal field, wherein the first signal field is transmitted through two symbols, wherein the first signal field includes first information related to a Physical layer (PHY) version of the PPDU, wherein the first information is determined based on whether the PPDU is an extremely high throughput (EHT) PPDU, wherein the second signal field includes second information which is related to transmission of the PPDU configured based on the first information; and decode the PPDU based on the first signal field and the second signal field.

The technical features of the present specification may be implemented based on a CRM (computer readable medium). For example, the CRM proposed by this specification stores instructions that perform operations comprising: receiving a Physical Layer Protocol Data Unit (PPDU), wherein the PPDU includes a first signal field and a second signal field, wherein the first signal field is transmitted through two symbols, wherein the first signal field includes first information related to a Physical layer (PHY) version of the PPDU, wherein the first information is determined based on whether the PPDU is an extremely high throughput (EHT) PPDU, wherein the second signal field includes second information which is related to transmission of the PPDU configured based on the first information; and decoding the PPDU based on the first signal field and the second signal field. At least one processor related to the CRM in the present specification may be the processor(s) 111 and/or 121, or the processing chip(s) 114 and/or 124 of FIG. 1, or the processor 610 of FIG. 19. Meanwhile, the CRM of the present specification may be the memory(s) 112 and/or 122 of FIG. 1, the memory 620 of FIG. 19, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed:

1. A method performed by a receiving station (STA) in a wireless local area network (WLAN) system, the method comprising:
   receiving a Physical Layer Protocol Data Unit (PPDU),
      wherein the PPDU includes a universal signal (U-SIG) field and an extremely high throughput signal (EHT-SIG) field,
      wherein the U-SIG field has a length of two symbols,
      wherein the U-SIG field includes first information related to a Physical layer (PHY) version of the PPDU,
      wherein the first information has a length of 3 bits, wherein the first information is determined based on whether the PPDU is an extremely high throughput (EHT) PPDU, wherein the U-SIG field further includes control information indicating that the PPDU is related to a single user (SU) mode, wherein the EHT-SIG field is configured for a single user (SU), wherein the EHT-SIG field is duplicated in units of 20 MHZ, wherein the EHT-SIG field includes a common field and a user specific field; and decoding the PPDU based on the U-SIG field and the EHT-SIG field.

2. The method of claim 1, wherein
the EHT-SIG field includes second information, wherein the second information includes overflow information overflowed from the U-SIG field.

3. The method of claim 1, wherein
the EHT-SIG field includes second information, wherein the second information includes at least one of: information related to a size of a long training field (LTF); information related to a number of symbols of the LTF; information related to a Low Density Parity Check Code (LDPC) extra symbol; information related to a pre-forward error correction (FEC) padding factor; and information related to a packet extension (PE).

4. The method of claim 1, wherein the EHT-SIG field includes second information, wherein the second information is included in the common field, and the common field further includes information related to resource unit (RU) allocation.

5. The method of claim 1, wherein the common field and the user specific field are separately encoded, wherein the common field includes first cyclic redundancy check (CRC) bits and first tail bits for the common field, wherein the user specific field includes second CRC bits and second tail bits for the user specific field.

6. The method of claim 1, wherein the user specific field is configured based on whether Orthogonal Frequency Division Multiplexing Access (OFDMA) or Multi User-Multiple Input Multiple Output (MU-MIMO) is applied.

7. A method performed by a transmitting station (STA) in a wireless local area network (WLAN) system, the method comprising:

generating a Physical Layer Protocol Data Unit (PPDU), wherein the PPDU includes a universal signal (U-SIG) field and an extremely high throughput signal (EHT-SIG) field, wherein the U-SIG field has a length of two symbols, wherein the U-SIG field includes first information related to a Physical layer (PHY) version of the PPDU, wherein the first information has a length of 3 bits, wherein the first information is determined based on whether the PPDU is an extremely high throughput (EHT) PPDU, wherein the U-SIG field further includes control information indicating that the PPDU is related to a single user (SU) mode, wherein the EHT-SIG field is configured for a single user (SU), wherein the EHT-SIG field is duplicated in units of 20 MHZ, wherein the EHT-SIG field includes a common field and a user specific field; and transmitting the PPDU, wherein the first signal field has a length of two symbols.

8. The method of claim 7, wherein
the EHT-SIG field includes second information, wherein the second information includes overflow information overflowed from the U-SIG field.

9. The method of claim 7, wherein
the EHT-SIG field includes second information, wherein the second information includes at least one of: information related to a size of a long training field (LTF); information related to a number of symbols of the LTF; information related to a Low Density Parity Check Code (LDPC) extra symbol; information related to a pre-forward error correction (FEC) padding factor; and information related to a packet extension (PE).

10. The method of claim 7, wherein the EHT-SIG field includes second information, wherein the second information is included in the common field, and the common field further includes information related to resource unit (RU) allocation.

11. A transmitting station (STA) in a wireless local area network (WLAN) system, comprising:

a transceiver transmitting a wireless signal; and a processor coupled to the transceiver, wherein processor is adapted to:

generate a Physical Layer Protocol Data Unit (PPDU), wherein the PPDU includes a universal signal (U-SIG) field and an extremely high throughput signal (EHT-SIG) field, wherein the U-SIG field has a length of two symbols, wherein the U-SIG field includes first information related to a Physical layer (PHY) version of the PPDU, wherein the first information has a length of 3 bits, wherein the first information is determined based on whether the PPDU is an extremely high throughput (EHT) PPDU, wherein the U-SIG field further includes control information indicating that the PPDU is related to a single user (SU) mode, wherein the EHT-SIG field is configured for a single user (SU), wherein the EHT-SIG field is duplicated in units of 20 MHZ, wherein the EHT-SIG field includes a common field and a user specific field; and transmit the PPDU, wherein the first signal field has a length of two symbols.

12. The transmitting STA of claim 11, wherein
the EHT-SIG field includes second information, wherein the second information includes overflow information overflowed from the U-SIG field.

13. The transmitting STA of claim 11, wherein
the EHT-SIG field includes second information, wherein the second information includes at least one of: information related to a size of a long training field (LTF); information related to a number of symbols of the LTF; information related to a Low Density Parity Check Code (LDPC) extra symbol; information related to a pre-forward error correction (FEC) padding factor; and information related to a packet extension (PE).

14. The transmitting STA of claim 11, wherein the EHT-SIG field includes second information, wherein the second information is included in the common field, and the common field further includes information related to resource unit (RU) allocation.

* * * * *